US012755361B2

(12) United States Patent
Miyazawa

(10) Patent No.: US 12,755,361 B2
(45) Date of Patent: Oct. 6, 2026

(54) IMAGE PROCESSING APPARATUS AND IMAGE PROCESSING METHOD

(71) Applicant: SONY GROUP CORPORATION, Tokyo (JP)

(72) Inventor: Ryota Miyazawa, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 268 days.

(21) Appl. No.: 18/556,954

(22) PCT Filed: Feb. 16, 2022

(86) PCT No.: PCT/JP2022/006239
§ 371 (c)(1),
(2) Date: Oct. 24, 2023

(87) PCT Pub. No.: WO2022/244351
PCT Pub. Date: Nov. 24, 2022

(65) Prior Publication Data

US 2024/0221139 A1 Jul. 4, 2024

(30) Foreign Application Priority Data

May 17, 2021 (JP) ................................ 2021-082995

(51) Int. Cl.
*G06T 7/00* (2017.01)
*G06T 5/20* (2006.01)
(Continued)

(52) U.S. Cl.
CPC .............. *G06T 7/0002* (2013.01); *G06T 5/20* (2013.01); *G06T 5/70* (2024.01); *G06T 7/246* (2017.01);
(Continued)

(58) Field of Classification Search
CPC ........... G06T 7/002; G06T 7/246; G06T 5/20; G06T 2207/30168; G06T 5/70;
(Continued)

(56) References Cited

U.S. PATENT DOCUMENTS

| | | | | |
|---|---|---|---|---|
| 7,164,807 B2 * | 1/2007 | Morton | G06T 5/10 | 382/269 |
| 2006/0088191 A1 * | 4/2006 | Zhang | G06V 20/40 | 382/103 |
| 2009/0086024 A1 * | 4/2009 | Brookins | H04N 23/80 | 348/222.1 |
| 2011/0069205 A1 * | 3/2011 | Kasai | G06T 7/254 | 382/107 |

(Continued)

FOREIGN PATENT DOCUMENTS

| | | |
|---|---|---|
| JP | 2006-080845 A | 3/2006 |
| JP | 2011-087269 A | 4/2011 |

(Continued)

OTHER PUBLICATIONS

International Search Report and Written Opinion of PCT Application No. PCT/JP2022/006239, issued on May 10, 2022, 08 pages of ISRWO.

*Primary Examiner* — Matthew C Bella
(74) *Attorney, Agent, or Firm* — CHIP LAW GROUP

(57) ABSTRACT

An image processing apparatus is provided with a moire detection unit that detects a pixel region with a different motion out of a pixel region in which the same motion as a motion of a subject is assumed as a change in an in-frame position between images at different times, and generates detection information of moire.

12 Claims, 15 Drawing Sheets

(51) Int. Cl.

| | |
|---|---|
| ***G06T 5/70*** | (2024.01) |
| ***G06T 7/246*** | (2017.01) |
| ***H04N 1/409*** | (2006.01) |
| ***H04N 5/14*** | (2006.01) |
| ***H04N 5/21*** | (2006.01) |
| ***H04N 23/60*** | (2023.01) |

(52) U.S. Cl.
CPC ........................ *H04N 23/60* (2023.01); *G06T 2207/30168* (2013.01); *H04N 1/409* (2013.01); *H04N 5/144* (2013.01); *H04N 5/145* (2013.01); *H04N 5/147* (2013.01); *H04N 5/21* (2013.01)

(58) Field of Classification Search
CPC ........ H04N 23/60; H04N 1/409; H04N 5/144; H04N 5/145; H04N 5/147; H04N 5/21
See application file for complete search history.

(56) References Cited

U.S. PATENT DOCUMENTS

| | | | | |
|---|---|---|---|---|
| 2016/0080830 | A1* | 3/2016 | Kim | H04N 21/2665 725/19 |
| 2020/0226822 | A1* | 7/2020 | Sundaram | G06T 5/20 |
| 2022/0046171 | A1* | 2/2022 | Kumaki | G06N 20/00 |

FOREIGN PATENT DOCUMENTS

| | | | | | |
|---|---|---|---|---|---|
| JP | 2012010170 | A | * | 1/2012 | |
| JP | 2012-129747 | A | | 7/2012 | |
| JP | 2016076740 | A | | 5/2016 | |
| JP | 2018-207414 | A | | 12/2018 | |
| WO | 2016/157299 | A1 | | 10/2016 | |
| WO | WO-2020077866 | A1 | * | 4/2020 | G06F 18/2411 |

* cited by examiner

IMAGE PROCESSING APPARATUS AND IMAGE PROCESSING METHOD

CROSS REFERENCE TO RELATED APPLICATIONS

This application is a U.S. National Phase of International Patent Application No. PCT/JP2022/006239 filed on Feb. 16, 2022, which claims priority benefit of Japanese Patent Application No. JP 2021-082995 filed in the Japan Patent Office on May 17, 2021. Each of the above-referenced applications is hereby incorporated herein by reference in its entirety.

TECHNICAL FIELD

The present technology relates to an image processing apparatus, an image processing method, and a program, and particularly relates to a technical field regarding moire generated in an image.

BACKGROUND ART

A general camera suppresses generation of moire by cutting a portion exceeding the Nyquist frequency of a mounted image sensor using an optical low-pass filter, but cannot completely eliminate the generation of moire cannot be completely eliminated in consideration of a balance with a sense of resolution.

In this regard, Patent Document 1 below proposes a technique of preparing two optical systems having different resolutions, detecting moire from such a difference, and reducing the moire.

Furthermore, Patent Document 2 below discloses a technique of detecting moire from a difference between two frames obtained by varying a cutoff frequency using a variable optical low-pass filter and reducing the moire.

CITATION LIST

Patent Document

Patent Document 1: Japanese Patent Application Laid-Open No. 2018-207414

Patent Document 2: Japanese Patent Application Laid-Open No. 2006-80845

SUMMARY OF THE INVENTION

Problems to be Solved by the Invention

In any of the cases described above, however, differences between two images also include a high-frequency component as an actual image that is not moire, and only a difference in a low-frequency portion is moire. That is, moire folded to a low frequency can be detected, but it is difficult to discriminate a difference between moire and an actual high-frequency component in a high-frequency portion. Therefore, there is a trade-off relationship between maintaining the sense of resolution of the high-frequency portion and eliminating the moire.

In this regard, the present technology proposes a technique capable of detecting moire by distinguishing the moire from a pattern in an actual image regardless of a frequency of the moire.

Solutions to Problems

An image processing apparatus according to the present technology includes a moire detection unit that detects a pixel region with a different motion out of a pixel region in which the same motion as a motion of a subject is assumed as a change in an in-frame position between images at different times, and generates detection information of moire.

It is conceivable that the images at different times include, for example, an image obtained at a current time point and an image obtained one to several frames ago. In a case where there is a change in an in-frame position of a certain subject between frames at different times, that is, in a case where there is a motion, if a pixel region, assumed to show the same motion as the motion, has a different motion, the pixel region is determined as moire.

MODE FOR CARRYING OUT THE INVENTION

Figure 1:
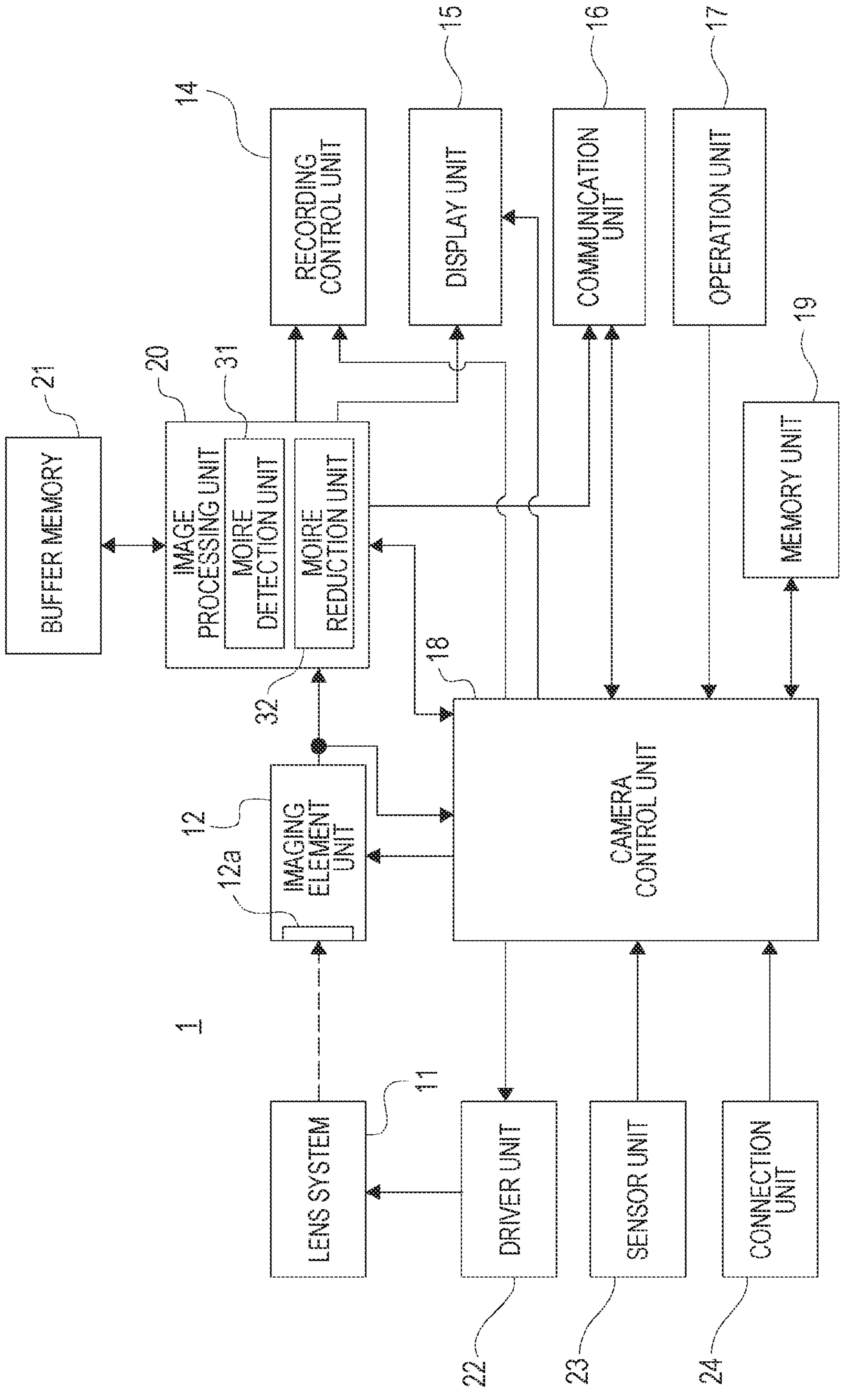
FIG. 1 is a block diagram of an imaging apparatus of an embodiment of the present technology.

Hereinafter, an embodiment will be described in the following order.

<1. Configuration of Imaging Apparatus>

<2. Configuration of Information Processing Apparatus>

<3. Configuration of Image Processing and Outline of Processing>

<4. Example of Moire Detection Processing>

<5. Example of Moire Reduction Processing>

<6. Conclusion and Modification>

Note that, in the present disclosure, a "motion" of a subject in images means that an in-frame position of a whole or a part of the subject changes between the images at different times.

For example, a change in an in-frame position of a whole or a part of a so-called moving subject itself such as a human, an animal, or a machine caused when the whole or the part of the moving subject moves is one aspect expressed as the "motion" in the present disclosure.

Furthermore, a change in an in-frame position of a stationary subject such as a landscape or a still object due to a change in an image capturing direction such as panning or tilting of an imaging apparatus (camera) is also one aspect expressed as the "motion".

Furthermore, it does not particularly matter whether an "image" is a still image or a moving image at the stage of recording. It is assumed that the imaging apparatus performs imaging of an image of one frame at each time at a predetermined frame rate, and as a result, one frame is recorded as a still image or a moving image of consecutive frames is recorded.

An image processing apparatus according to the embodiment is assumed to be mounted as an image processing unit in the imaging apparatus (camera) or an information processing apparatus that performs image editing or the like. Furthermore, the imaging apparatus or the information processing apparatus itself on which the image processing unit is mounted can also be considered as the image processing apparatus.

1. CONFIGURATION OF IMAGING APPARATUS

A configuration example of an imaging apparatus 1 will be described with reference to FIG. 1.

The imaging apparatus 1 includes an image processing unit 20 that performs moire detection processing, and the image processing unit 20 or the imaging apparatus 1 including the image processing unit 20 can be considered as an example of the image processing apparatus of the present disclosure.

The imaging apparatus 1 includes, for example, a lens system 11, an imaging element unit 12, a recording control unit 14, a display unit 15, a communication unit 16, an operation unit 17, a camera control unit 18, a memory unit 19, an image processing unit 20, a buffer memory 21, a driver unit 22, a sensor unit 23, and a connection unit 24.

The lens system 11 includes lenses such as a zoom lens, and a focus lens, a diaphragm mechanism, and the like. Light (incident light) from a subject is guided by the lens system 11 and condensed on the imaging element unit 12.

Furthermore, the lens system 11 can be provided with an optical low-pass filter configured for moire reduction, for example, by a birefringent plate or the like. However, it is difficult to completely remove moire with the optical low-pass filter, and the moire that cannot be removed with the optical low-pass filter is detected and reduced by the image processing unit 20 in the present embodiment. Note that detection and reduction of moire by the image processing unit 20 are effective even in a case where the optical low-pass filter is not provided.

The imaging element unit 12 includes, for example, an imaging element (image sensor) 12*a* of a complementary metal oxide semiconductor (CMOS) type, a charge coupled device (CCD) type, or the like.

The imaging element unit 12 performs, for example, correlated double sampling (CDS) processing, automatic gain control (AGC) processing, and the like on an electric signal obtained by photoelectrically converting light received by the imaging element 12*a*, and further performs analog/digital (A/D) conversion processing. Then, an imaging signal as digital data is output to the image processing unit 20 and the camera control unit 18 in a subsequent stage.

The image processing unit 20 is configured as an image processing processor by, for example, a digital signal processor (DSP) or the like.

The image processing unit 20 performs various types of signal processing on a digital signal (captured image signal), that is, RAW image data, from the imaging element unit 12.

For example, the image processing unit 20 performs lens correction, noise reduction, synchronization processing, YC generation processing, color reproduction/sharpness processing, and the like.

In the synchronization processing, color separation processing is performed such that image data for each pixel has all the R, G, and B color components. For example, in the case of an imaging element using a Bayer array color filter, demosaic processing is performed as the color separation processing.

In the YC generation processing, a luminance (Y) signal and a color (C) signal are generated (separated) from image data of R, G, and B.

In the color reproduction/sharpness processing, processing of adjusting gradation, saturation, tone, contrast, and the like as so-called image creation is performed.

The image processing unit 20 performs signal processing in this manner, that is, signal processing generally called development processing, and generates image data in a predetermined format.

In this case, resolution conversion or file formation processing may be performed. In the file formation processing, image data is subjected to, for example, compression encoding for recording or communication, formatting, and generation or addition of metadata to generate a file for recording or communication.

For example, an image file in a format such as Joint Photographic Experts Group (JPEG), Tagged Image File Format (TIFF), Graphics Interchange Format (GIF), High Efficiency Image File Format (HEIF), YUV 422, and YUV 420 is generated as a still image file. Furthermore, it is also conceivable to generate an image file as an MP4 format or the like used for recording a moving image and audio conforming to MPEG-4.

Note that an image file of RAW image data not subjected to development processing may also be generated.

In the case of the present embodiment, the image processing unit 20 has signal processing functions as a moire detection unit 31 and a moire reduction unit 32.

Figure 3:
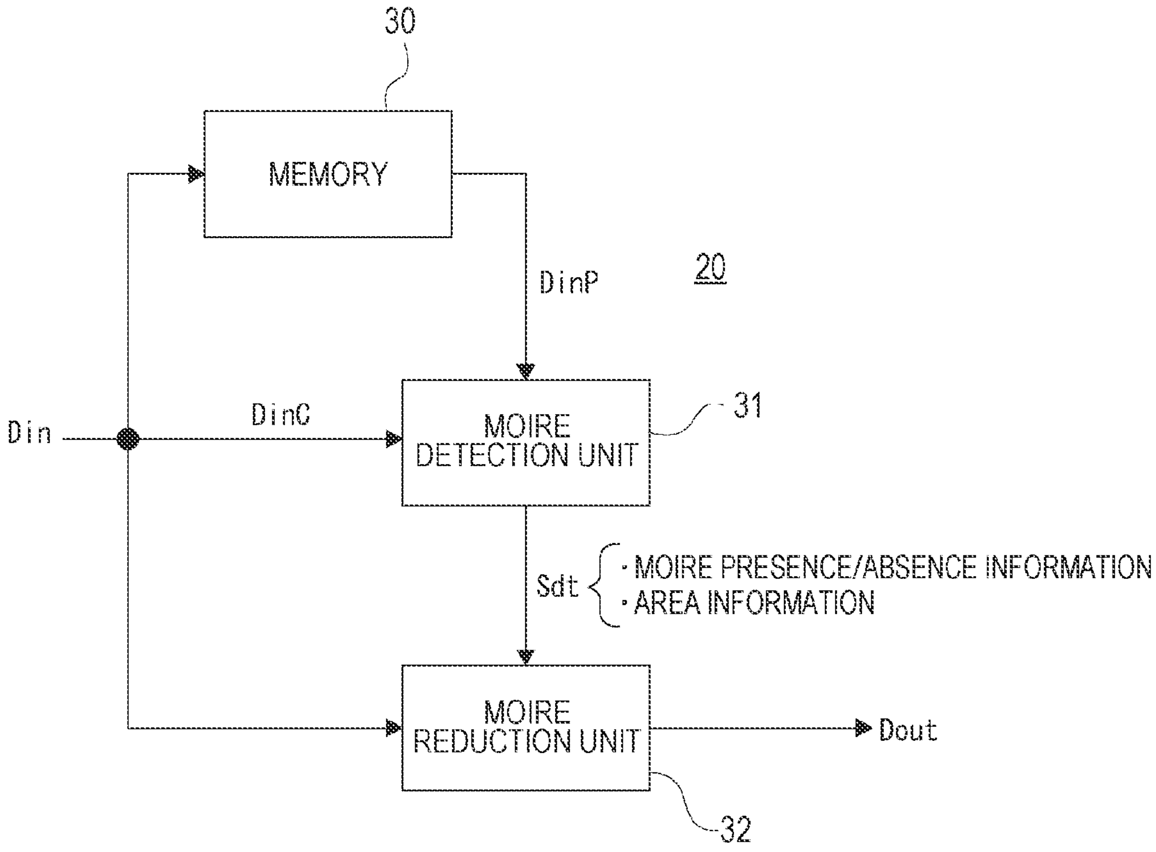
FIG. 3 is a block diagram of a configuration example of the image processing apparatus according to the embodiment.

The moire detection unit 31 performs processing of detecting a pixel region in which a different motion appears out of a pixel region in which the same motion as a motion of a subject is assumed as a change in an in-frame position between images at different times, and generating detection information Sdt of moire (see FIG. 3).

The moire reduction unit 32 performs moire reduction processing on the basis of the detection information Sdt.

Details of these signal processing functions will be described later. Note that there may be a case where the moire reduction unit 32 is not provided in the image processing unit 20.

The buffer memory 21 includes, for example, a dynamic random access memory (D-RAM). The buffer memory 21 is used for temporary storage of image data in the process of the development processing and the like in the image processing unit 20.

Note that the buffer memory 21 may be a memory chip separate from the image processing unit 20, or may be configured in an internal memory area such as a DSP forming the image processing unit 20.

The recording control unit 14 performs recording and reproduction on a recording medium configured using a nonvolatile memory, for example. The recording control unit 14 performs processing of recording an image file such as moving image data or still image data on a recording medium, for example.

Actual forms of the recording control unit 14 can be diversely considered. For example, the recording control unit 14 may be configured as a flash memory built in the imaging apparatus 1 and a write/read circuit thereof. Furthermore, the recording control unit 14 may be in a form of a card recording/reproducing unit that performs recording/reproducing access to a recording medium detachable from the imaging apparatus 1, for example, a memory card (portable flash memory or the like). Furthermore, the recording control unit 14 may be implemented as a hard disk drive (HDD) or the like as a form built in the imaging apparatus 1.

The display unit 15 is a display unit that performs various displays for the user, and is, for example, a display panel or a viewfinder using a display device such as a liquid crystal display (LCD) or an organic electro-luminescence (EL) display arranged in a housing of the imaging apparatus 1.

The display unit 15 executes various displays on a display screen on the basis of an instruction from the camera control unit 18. For example, the display unit 15 displays a reproduced image of image data read from the recording medium in the recording control unit 14.

Furthermore, there is a case where image data of a captured image whose resolution has been converted for a display by the image processing unit 20 is supplied to the display unit 15, and the display unit 15 performs the display on the basis of the image data of the captured image in response to an instruction from the camera control unit 18. Therefore, a so-called through image (subject monitoring image), which is a captured image during composition confirmation or during moving image recording, is displayed.

Furthermore, the display unit 15 executes displays of various operation menus, icons, messages, and the like, that is, graphical user interfaces (GUIs) on the screen on the basis of an instruction from the camera control unit 18.

The communication unit 16 performs data communication and network communication with an external device in a wired or wireless manner. For example, a still image file or a moving image file including captured image data or metadata is transmitted and output to an external information processing apparatus, an external display apparatus, an external recording apparatus, an external reproduction apparatus, external information processing apparatus, or the like.

Furthermore, the communication unit 16 as a network communication unit can perform communication using various networks, for example, the Internet, a home network, a local area network (LAN), and the like, and transmit and receive various types of data to and from a server, a terminal, and the like on the network.

Furthermore, the imaging apparatus 1 may be capable of performing information communication by the communication unit 16 mutually with, for example, a PC, a smartphone, a tablet terminal, or the like using short-range wireless communication such as Bluetooth (registered trademark), Wi-Fi (registered trademark) communication, or near field communication (NFC), infrared communication, or the like. Furthermore, the imaging apparatus 1 and another device may be capable of communicating with each other using wired connection communication.

Therefore, the imaging apparatus 1 can transmit image data and metadata to an information processing apparatus 70 described later or the like by the communication unit 16.

The operation unit 17 collectively represents input devices configured for the user to perform various operation inputs. Specifically, the operation unit 17 represents various operation elements (a key, a dial, a touch panel, a touch pad, and the like) provided in the housing of the imaging apparatus 1.

An operation of the user is detected by the operation unit 17, and a signal corresponding to the input operation is transmitted to the camera control unit 18.

The camera control unit 18 is configured using a microcomputer (arithmetic processing device) including a central processing unit (CPU).

The memory unit 19 stores information and the like used for processing by the camera control unit 18. As the illustrated memory unit 19, for example, a read only memory (ROM), a random access memory (RAM), a flash memory, and the like are comprehensively illustrated.

The memory unit 19 may be a memory area built in a microcomputer chip serving as the camera control unit 18 or may be configured using a separate memory chip.

The camera control unit 18 controls the entire imaging apparatus 1 by executing a program stored in the ROM or the flash memory of the memory unit 19 or the like.

For example, the camera control unit 18 controls necessary operations of the respective units regarding control of a shutter speed of the imaging element unit 12, instructions of the various types of signal processing in the image processing unit 20, an imaging operation or an image recording operation according to an operation of the user, a reproduction operation of a recorded image file, operations of the lens system 11, such as zooming, focusing, and diaphragm adjustment in a lens barrel, and the like. Furthermore, the camera control unit 18 detects operation information of the operation unit 17 and performs display control of the display unit 15 as user interface operations. Furthermore, the camera control unit 18 also performs control related to a communication operation with the external device by the communication unit 16.

The RAM in the memory unit 19 is used for temporary storage of data, a program, and the like as a work area during various types of data processing of the CPU of the camera control unit 18.

The ROM and the flash memory (nonvolatile memory) in the memory unit 19 are used to store an operating system (OS) for the CPU to control the respective units and a content file such as an image file. Furthermore, the ROM and the flash memory in the memory unit 19 are used to store application programs for various operations of the camera control unit 18 and the image processing unit 20, firmware, various types of setting information, and the like.

The driver unit 22 is provided with, for example, a motor driver for a zoom lens drive motor, a motor driver for a focus lens drive motor, a motor driver for a diaphragm mechanism motor, and the like.

In these motor drivers, a drive current is applied to the corresponding driver in response to an instruction from the camera control unit 18 to perform moving the focus lens and zoom lens, opening and closing diaphragm blades of the diaphragm mechanism, and the like.

The sensor unit 23 comprehensively indicates various sensors mounted on the imaging apparatus.

In a case where an inertial measurement unit (IMU), for example, is mounted as the sensor unit 23, an angular velocity can be detected by an angular velocity (gyro) sensor of three axes of pitch, yaw, and roll, for example, and acceleration can be detected by an acceleration sensor.

Furthermore, as the sensor unit 23, for example, a position information sensor, an illuminance sensor, a distance measuring sensor, and the like may be mounted.

Various types of information detected by the sensor unit 23, for example, position information, distance information, illuminance information, IMU data, and the like are supplied to the camera control unit 18, and can be associated with a captured image as metadata together with date and time information managed by the camera control unit 18.

The camera control unit 18 can generate the metadata for each frame of the image, for example, and cause the recording control unit 14 to record the metadata together with the image on the recording medium in association with the frame of the image. Furthermore, for example, the camera control unit 18 can cause the communication unit 16 to transmit the metadata generated for each frame of the image to the external device together with image data in association with the frame of the image.

The connection unit 24 communicates with a so-called pan-tilter, a tripod, or the like on which the imaging apparatus 1 is mounted and which performs panning and tilting. For example, the connection unit 24 can receives an input of operation information, such as a direction or a speed of panning or tilting, from the pan-tilter or the like and transmit the operation information to the camera control unit 18.

2. CONFIGURATION OF INFORMATION PROCESSING APPARATUS

Next, a configuration example of the information processing apparatus 70 will be described with reference to FIG. 2.

The information processing apparatus 70 is a device capable of performing information processing, particularly image processing, such as a computer device. Specifically, a personal computer (PC), a mobile terminal apparatus such as a smartphone or a tablet, a mobile phone, a video editing apparatus, a video reproducing device, or the like is assumed as the information processing apparatus 70. Furthermore, the information processing apparatus 70 may be a computer apparatus configured as a server apparatus or a computing apparatus in cloud computing.

Then, the information processing apparatus 70 includes the image processing unit 20 that performs moire detection and moire reduction, and the image processing unit 20 or the information processing apparatus 70 including the image processing unit 20 can be considered as an example of the image processing apparatus of the present disclosure.

A CPU 71 of the information processing apparatus 70 executes various processes in accordance with a program stored in a nonvolatile memory unit 74 such as a ROM 72 or, for example, an electrically erasable programmable read-only memory (EEP-ROM), or a program loaded from a storage unit 79 to a RAM 73. Furthermore, the RAM 73 also appropriately stores data and the like necessary for the CPU 71 to execute the various types of processing.

The image processing unit 20 has functions as the moire detection unit 31 and the moire reduction unit 32 described in the above imaging apparatus 1.

The moire detection unit 31 and the moire reduction unit 32 as the image processing unit 20 may be provided as functions in the CPU 71.

Furthermore, the image processing unit 20 may be realized by a CPU, a graphics processing unit (GPU), general-purpose computing on graphics processing units (GPGPU), an artificial intelligence (AI) processor, or the like that is separate from the CPU 71.

The CPU 71, the ROM 72, the RAM 73, the nonvolatile memory unit 74, and the image processing unit 20 are connected to one another via a bus 83. An input/output interface 75 is also connected to the bus 83.

An input unit 76 including an operation element and an operation device is connected to the input/output interface 75. For example, as the input unit 76, various types of operation elements and operation devices such as a keyboard, a mouse, a key, a dial, a touch panel, a touch pad, a remote controller, and the like are assumed.

A user operation is detected by the input unit 76, and a signal corresponding to an input operation is interpreted by the CPU 71.

A microphone is also assumed as the input unit 76. A voice uttered by the user can also be input as the operation information.

Furthermore, a display unit 77 including an LCD, an organic EL panel, or the like, and a voice output unit 78 including a speaker or the like are connected to the input/output interface 75 integrally or separately.

The display unit 77 is a display unit that performs various types of displays, and includes, for example, a display device provided in a housing of the information processing apparatus 70, a separate display device connected to the information processing apparatus 70, and the like.

The display unit 77 executes display of an image for various types of image processing, a moving image to be processed, and the like on a display screen on the basis of an instruction from the CPU 71. Furthermore, the display unit 77 displays various types of operation menus, icons, messages, and the like, that is, displays as a graphical user interface (GUI) on the basis of the instruction from the CPU 71.

There is also a case where the storage unit 79 including an HDD, a solid-state memory, or the like, and a communication unit 80 including a modem or the like are connected to the input/output interface 75.

The storage unit 79 can store data to be processed and various programs.

In a case where the information processing apparatus 70 functions as the image processing apparatus of the present disclosure, it is also assumed that the storage unit 79 stores image data to be processed and stores the detection information Sdt obtained by moire detection processing, image data obtained by performing moire reduction processing, and the like.

Furthermore, programs for the moire detection processing and the moire reduction processing may be stored in the storage unit 79.

The communication unit 80 performs communication processing via a transmission path such as the Internet, wired/wireless communication with various devices, bus communication, and the like.

Communication with the imaging apparatus 1, for example, reception of captured image data, metadata, and the like is performed by the communication unit 80.

A drive 81 is also connected to the input/output interface 75 as necessary, and a removable recording medium 82 such as a magnetic disk, an optical disk, a magneto-optical disk, a semiconductor memory, or the like is appropriately mounted.

The drive 81 can read a data file such as an image file, various computer programs, and the like from the removable recording medium 82. The read data file is stored in the storage unit 79, and images and sound included in the data file are output by the display unit 77 and the voice output unit 78. Furthermore, the computer programs and the like read from the removable recording medium 82 are installed in the storage unit 79 as necessary.

In the information processing apparatus 70, for example, software for the processing of the present embodiment can be installed via network communication by the communication unit 80 or the removable recording medium 82. Alternatively, the software may be stored in advance in the ROM 72, the storage unit 79, or the like.

3. CONFIGURATION OF IMAGE PROCESSING AND OUTLINE OF PROCESSING

The image processing unit 20 in the imaging apparatus 1 and the information processing apparatus 70 described above will be described.

A subject having a frequency component exceeding the Nyquist frequency of the imaging element 12*a* of the imaging apparatus 1 causes moire as folding distortion. Basically, the moire is prevented by cutting the Nyquist frequency or higher using an optical low-pass filter before the imaging element 12*a*, but the complete cutting is difficult in view of a balance with a sense of resolution of an image.

In this regard, a moire portion (pixel region) is detected from a motion of the subject as post-processing on the image in which the moire is generated, and the moire is reduced by blurring the portion.

Here, when a subject is stationary relative to the imaging apparatus 1, it is difficult to discriminate between moire and an actual pattern, and it does not become too offensive in an image.

On the other hand, in a case where there is a motion in a subject in an image, an actual pattern moves in the same direction and at the same speed, whereas moire is not limited to such a motion, and thus, it is considered that the moire can be discriminated.

FIG. 3 illustrates a configuration example for moire detection and moire reduction in the image processing unit 20.

Image data Din indicates image data as a target of moire detection processing, and is, for example, image data sequentially input per frame. The image data Din of the frame at each time is input to each of the memory 30, the moire detection unit 31, and the moire reduction unit 32.

For example, in the case of the imaging apparatus 1, it is conceivable that the image data Din is RAW image data input to the image processing unit 20. Alternatively, the image data Din may be image data obtained after development processing is partially or entirely performed.

For example, in the case of the imaging apparatus 1, a storage area of the buffer memory 21 inside or outside the image processing unit 20 is used as the memory 30. In the case of the information processing apparatus 70, for example, it is conceivable to use a storage area of the RAM 73. Any storage area may be used as the memory 30.

The moire detection unit 31 performs moire detection processing of detecting a pixel region in which a different motion appears out of a pixel region in which the same motion as a motion of a subject is assumed as a change in an in-frame position between images at different times, and generating detection information of moire.

Therefore, the image data Din is input as an image of a current frame (a current image DinC), and the image data Din stored in the memory 30 is read after a lapse of one frame period and input as a past image DinP.

Note that the past image DinP is not necessarily read after the lapse of one frame period. For example, the past image DinP may be read after a lapse of two frame periods or after a lapse of several frame periods. The moire detection unit 31 only needs to be capable of comparing the current image DinC with the past image DinP obtained earlier than the current image DinC, and a time difference between the current image DinC and the past image DinP used for the comparison may be set to a time appropriate for moire detection.

Figure 4:
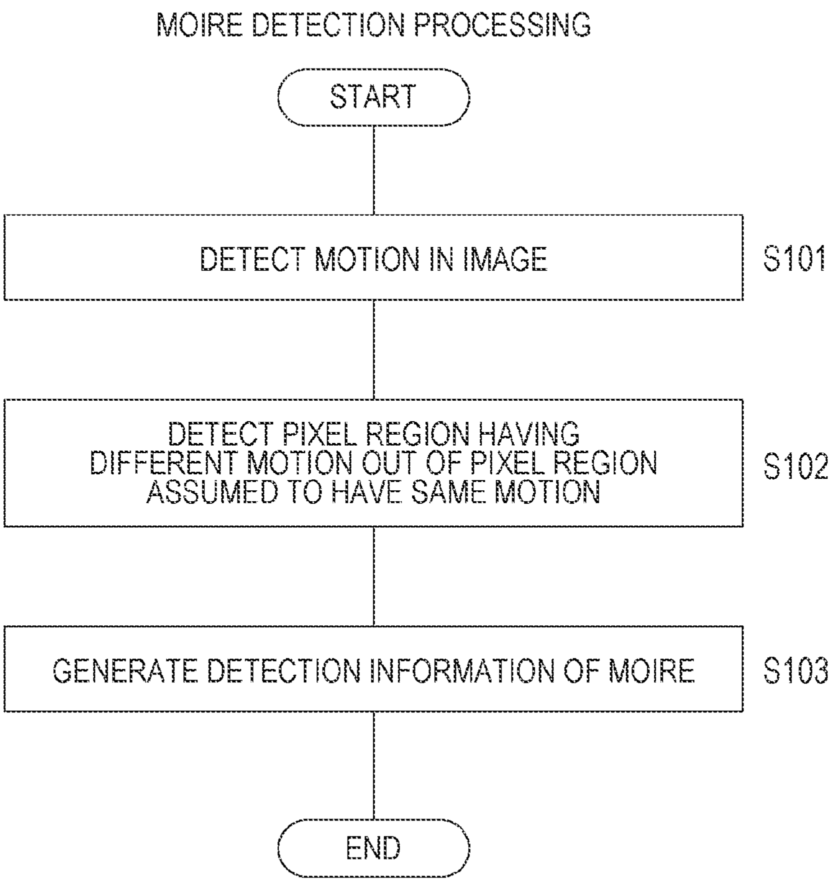
FIG. 4 is a flowchart of moire detection processing according to the embodiment.

The moire detection unit 31 performs the moire detection processing as illustrated in FIG. 4 using the current image DinC and the past image DinP every time image data of a frame as the current image DinC is input.

In step S101 of FIG. 4, the moire detection unit 31 detects a motion in an image. For example, a motion of a certain subject in the image is detected. Alternatively, a substantially uniform motion of all subjects in the image may be detected.

In step S102, the moire detection unit 31 detects a pixel region with a different motion out of a pixel region in which the same motion as the motion detected in step S101 is assumed. This "different motion" refers to, for example, a motion in which a motion direction (a direction of a change in an in-frame position) or a speed (a displacement amount between frames) is different.

Then, for example, in an image in which a moving subject such as a person, an animal, or a machine is captured, a region in a contour of the moving subject is considered as a region in which the same motion as a motion of the subject is assumed.

Furthermore, in an image in which only a still subject such as a landscape or a still object appears, a motion is sometimes detected by panning or the like of the imaging apparatus 1 itself. In such a case, the entire pixel region in such a frame is the pixel region in which the same motion as a motion of the subject is assumed.

The moire detection unit 31 compares the current image DinC with the past image DinP, and performs processing of detecting a portion in which a different motion appears in the pixel region in which the same motion as the motion of the subject is assumed.

In step S103, the moire detection unit 31 generates the detection information Sdt of moire on the basis of a detection result of the different motion.

The detection information Sdt may include moire presence/absence information indicating whether or not moire is generated in the current image DinC.

Alternatively, the detection information Sdt may include area information indicating a pixel region in which moire is generated regarding the current image DinC.

The detection information Sdt may include both the moire presence/absence information and the area information.

The detection information Sdt generated by the moire detection unit 31 in FIG. 3 in the above processing is supplied to the moire reduction unit 32.

The image data Din is input to the moire reduction unit 32 as a target of moire reduction processing. The moire reduction unit 32 performs the moire reduction processing, specifically, for example, low-pass filter (LPF) processing on the image data Din on the basis of the detection information Sdt.

Note that the detection information Sdt is the moire detection result obtained for the frame as the current image DinC by the moire detection unit 31, and thus, the moire reduction processing based on the detection information Sdt is performed on the image data Din of the same frame as the current image DinC.

Figure 5:
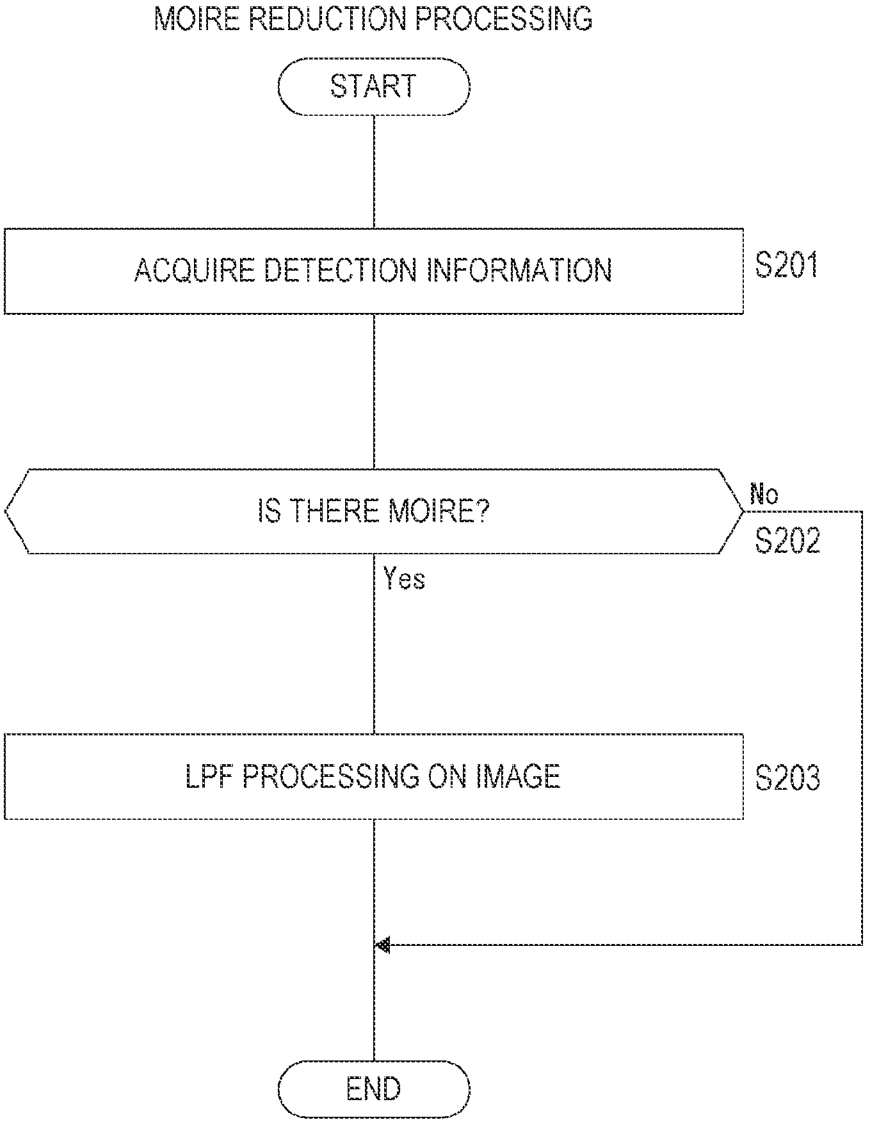
FIG. 5 is a flowchart of moire reduction processing according to the embodiment.

The moire reduction unit 32 performs the moire reduction processing on each frame of the image data Din as illustrated in FIG. 5, for example.

In step S201, the moire reduction unit 32 acquires the detection information Sdt corresponding to a frame of the image data Din to be processed at a current time point.

In step S202, the moire reduction unit 32 refers to the detection information Sdt to determine whether or not the frame to be currently processed is an image in which moire is generated. Moire presence/absence information can be used to perform the determination if being included in the detection information Sdt. Even if the detection information Sdt includes only area information, the generation of moire can be determined on the basis of whether or not a corresponding site is indicated as the area information.

In a case where it is determined that moire is generated, the moire reduction unit 32 proceeds to step S203, and reduces the moire by performing the LPF processing on the image data Din of the frame to be processed. Note that band-pass filter (BPF) processing of filtering a specific frequency band may be performed instead of the LPF processing.

In a case where it is determined that moire is not generated, the moire reduction unit 32 ends the processing of FIG. 5 for the image data Din of the frame to be processed without performing step S203.

As the moire reduction unit 32 performs the processing as described above, image data Dout in which the moire has been reduced (including eliminated) is obtained.

For example, when development processing is performed on the image data Dout, an image with reduced moire can be displayed.

Figure 6:
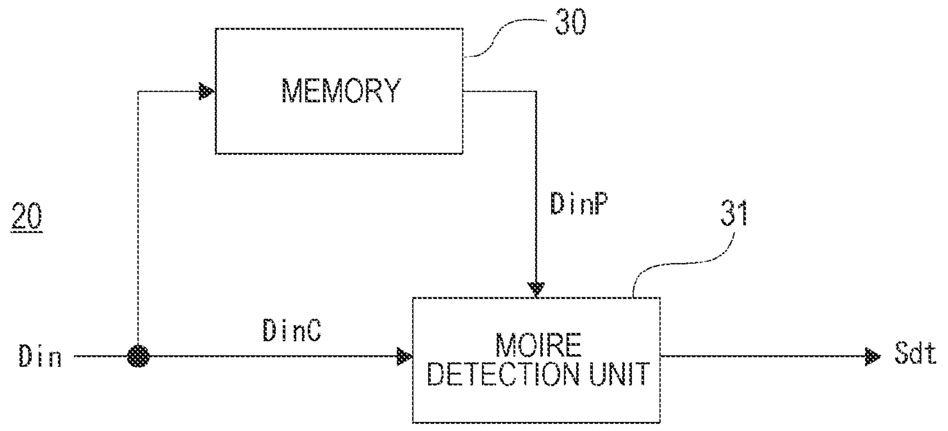
FIG. 6 is a block diagram of another configuration example of the image processing apparatus according to the embodiment.

Note that a configuration as illustrated in FIG. 6 is also conceivable as the image processing unit 20. That is, it is a configuration example in which the moire reduction unit 32 is not provided.

In this case, the moire detection unit 31 generates the detection information Sdt as described above. For example, the camera control unit 18 of the imaging apparatus 1 or the CPU 71 of the information processing apparatus 70 sets the detection information Sdt as metadata associated with a frame of the image data Din.

For example, the camera control unit 18 can cause the recording control unit 14 to record the metadata on a recording medium in association with each frame of the image data Dout. Alternatively, the camera control unit 18 can cause the communication unit 16 to transmit the image data Dout and the metadata associated with each frame to an external apparatus.

Therefore, the detection information Sdt of moire is associated with each frame of the image data. In this case, the moire reduction processing as illustrated in FIG. 5 can be performed in a device to which an image file including the image data and the metadata has been input, for example, the information processing apparatus 70. In this case, the detection information acquired in step S201 is read from the metadata corresponding to the frame set as the target of the moire reduction processing.

Note that the CPU 71 of the information processing apparatus 70 can also set the detection information Sdt as metadata associated with a frame of the image data Din, similarly to the camera control unit 18 described above. In this case, the metadata can be recorded on a recording medium in association with each frame of the image data Dout in the storage unit 79 or the like, or the image data Dout and the metadata associated with each frame can be transmitted from the communication unit 80 to an external apparatus.

4. EXAMPLE OF MOIRE DETECTION PROCESSING

Hereinafter, specific examples (a first example, a second example, and a third example) of moire detection processing by the moire detection unit 31 will be described. The respective examples are processing examples performed by the moire detection unit 31 that receives inputs of the current image DinC and the past image DinP as illustrated in FIG. 3.

The first example of the moire detection processing will be described with reference to FIGS. 7 to 10.

The first example is an example in which object recognition processing is performed on subjects in an image, and a pixel region in which a motion of each object does not coincide with a motion inside the object is determined as moire.

Figure 7:
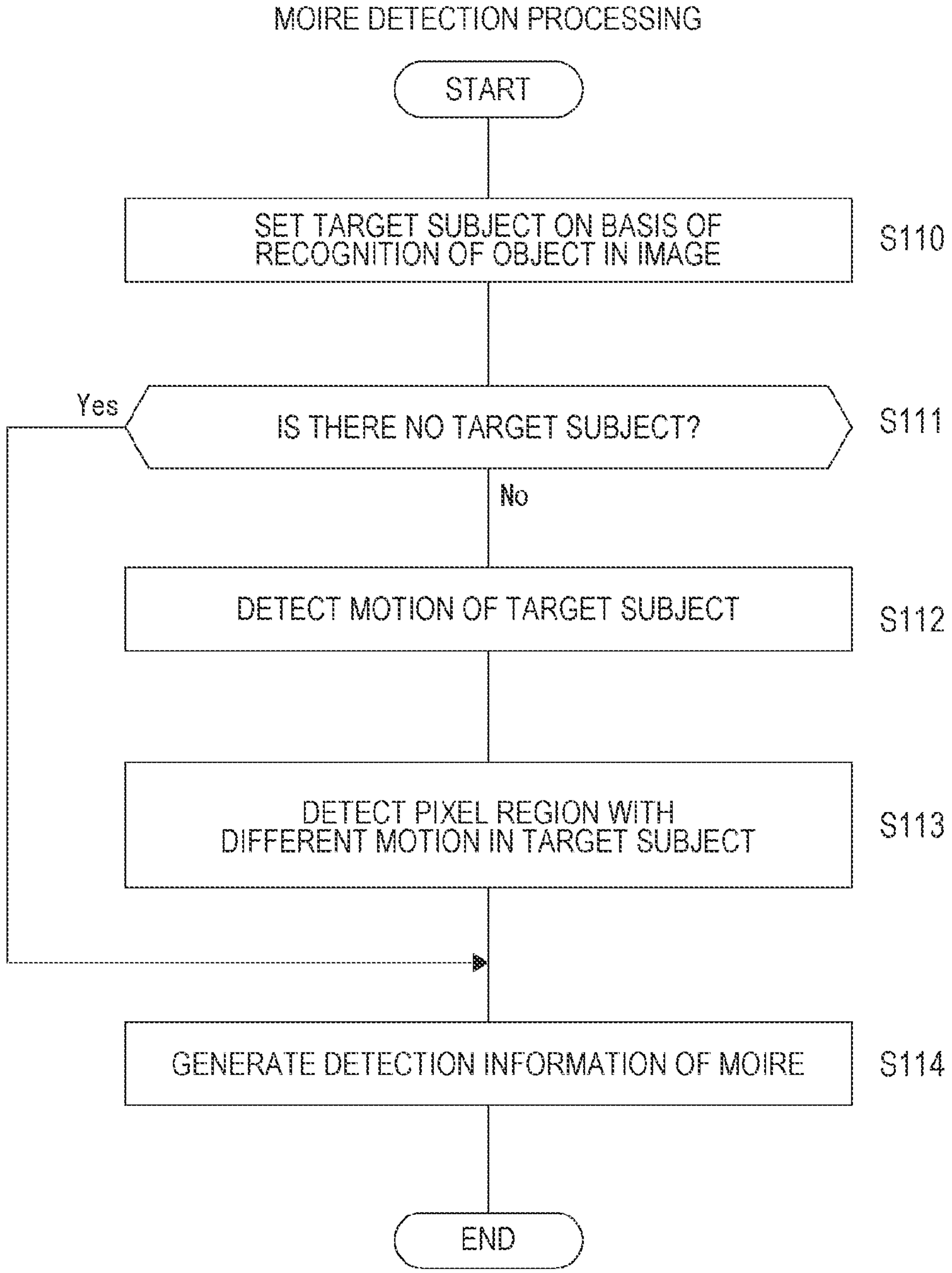
FIG. 7 is a flowchart of a first example of the moire detection processing according to the embodiment.

FIG. 7 is a flowchart illustrating the first example of the moire detection unit 31.

In step S110, the moire detection unit 31 performs the object recognition processing on the image, and sets a target subject on the basis of a recognition result.

In this case, the moire detection unit 31 performs processing of recognizing objects such as a person, an animal, and a thing by semantic segmentation processing, pattern recognition processing, or the like on subjects in the current image DinC, for example. For the sake of the description, these subjects recognized as some objects are referred to as an object A, an object B, an object C, and the like. Then, among these recognized objects, an object set as a target of motion detection is specified and set as the target subject.

For example, it is conceivable that the moire detection unit 31 sets one estimated to be the same individual as an object recognized in object recognition processing for the past image DinP as the target subject of motion detection.

Note that the object for the past image DinP can be determined, for example, on the basis of an object recognition result at a time point when the moire detection unit 31 treated a corresponding frame as the current image DinC in the past.

Then, for example, in a case where the object A, the object B, and the object C are recognized in the past image DinP and the object A and the object B are recognized in the current image DinC in current object recognition processing, the object A and the object B are set as the target subjects of motion detection.

In this manner, in step S110, one or more objects are set as the target subject on the basis of the object recognition processing for the image.

Note that there is also a case where it is difficult to set a target subject. For example, there is a case where there is no object determined to be a common individual between objects recognized in the current image DinC and objects recognized in the past image DinP. In such a case, the moire detection unit 31 proceeds from step S111 to step S114.

In a case where one or a plurality of objects has been set as the target subject in step S110, the moire detection unit 31 proceeds from step S111 to step S112, and detects a motion of each of one or a plurality of target subjects.

That is, an in-frame position in the past image DinP and an in-frame position in the current image DinC are compared to detect a motion for each target subject. The motions of the respective target subjects are detected, for example, the object A set as the target subject moving to the left on a screen at a speed "1", and the object B moving upward on the screen at a speed "3".

Note that there is also a case where no motion is detected for a certain target subject.

In step S113, the moire detection unit 31 detects a pixel region with a motion different from a motion of an object out of a pixel region of the object in which the motion has been detected among the objects set as the respective target subjects.

For example, in the pixel region as the object A set as the target subject, that is, in each of pixels corresponding to a contour of the subject as the object A, a portion in which a motion different from the motion detected for the object A occurs is detected.

Specifically, when the object A is detected to be "moving to the left on the screen at the speed "1"", pixels in which "moving to the left on the screen at the speed "1"" is not detected are detected among the pixels in the pixel region recognized as the object A. Such a region of one or a plurality of pixels is defined as a pixel region showing a different motion.

Then, in step S114, the moire detection unit 31 generates the detection information Sdt on the basis of detection of a pixel region showing a different motion.

For example, in a case where a pixel region showing a different motion is detected, moire presence/absence information indicating "presence of moire" is generated as the detection information Sdt. In a case where not even one pixel region showing a different motion is detected, moire presence/absence information indicating "absence of moire" is generated as the detection information Sdt.

Alternatively, area information that is information for specifying a pixel region showing a different motion is generated as the detection information Sdt. If there is no pixel region showing a different motion, area information indicating absence of the region is generated.

Note that, in the case of proceeding from step S111 to step S114, the moire presence/absence information indicating "absence of moire" or the area information indicating the absence of such an area is generated as the detection information Sdt.

A concept of the above processing will be described with reference to FIGS. 8 and 9.

Figure 8:
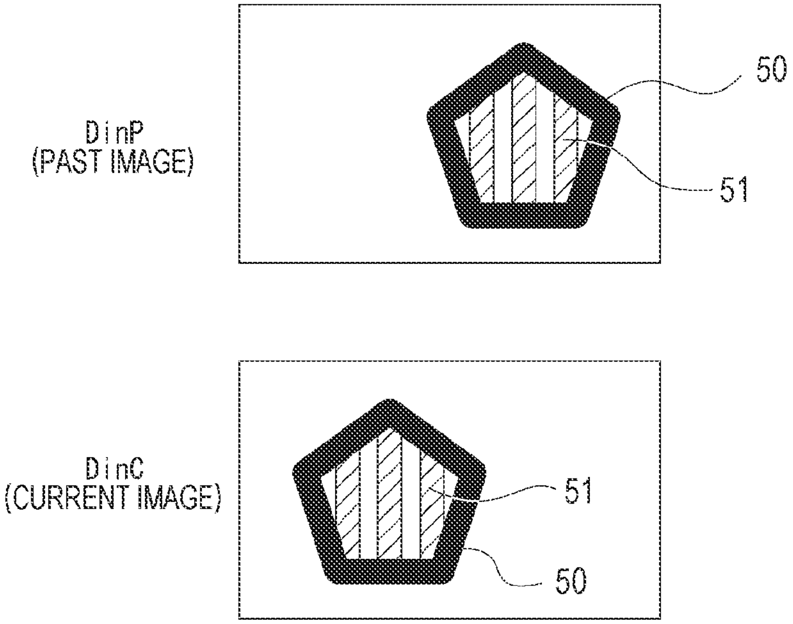
FIG. 8 is an explanatory view of a concept of moire detection according to the embodiment.

In FIG. 8, it is assumed that an object 50 is present as a subject in the past image DinP and the current image DinC. It is assumed that a vertical stripe pattern 51 (illustrated as stripes of a shaded portion and a non-shaded portion in the drawing) is seen in the object 50 on the image.

When the past image DinP and the current image DinC are compared, a motion on the image is detected. That is, the motion of the object 50 in the left direction at a certain speed is detected between frames at different times.

Here, when the pattern 51 inside the object 50 is viewed, the same motion at the same speed in the left direction is detected. In this case, it is determined that the pattern 51 is not moire but a pattern actually given on the object 50.

Figure 9:
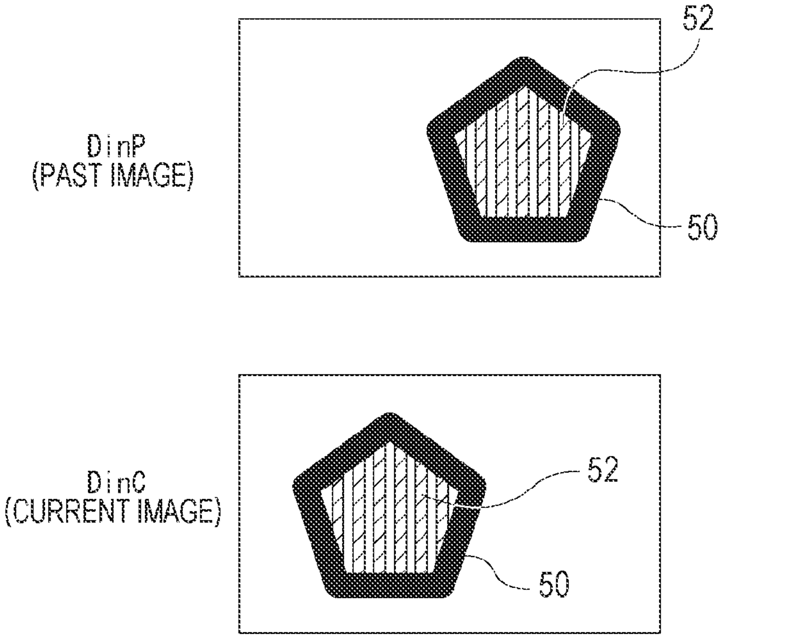
FIG. 9 is an explanatory view of the concept of the moire detection according to the embodiment.

On the other hand, in a case where the past image DinP and the current image DinC in FIG. 9 are compared, a motion of the object 50 at a certain speed in the left direction is detected, but when a pattern 52 inside the object 50 is viewed, the same motion is not detected in terms of one or both of the direction and the speed. That is, the motions of the object 50 and the pattern 52 do not coincide. In such a case, the pattern 52 is determined to be moire.

Note that there may be a pattern that actually moves in the object 50.

Figure 10:
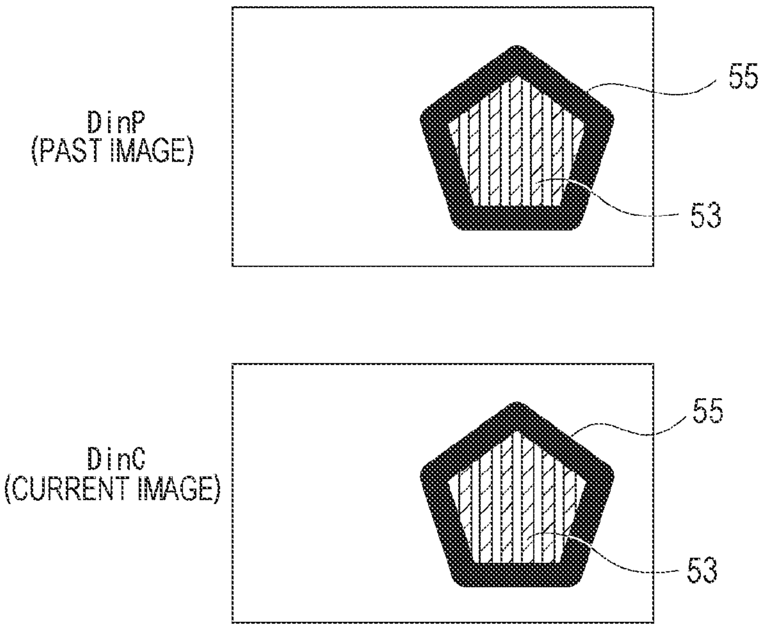
FIG. 10 is an explanatory view of the concept of the moire detection according to the embodiment.

For example, FIG. 10 illustrates an object 55 set as a subject, and it is assumed that a motion of the object 55 is not detected in a comparison between the past image DinP and the current image DinC.

However, it is assumed that a certain motion is detected for a pattern 53 inside the object 50. In this case, there is a high possibility that the pattern 53 is actually moving.

Therefore, in a case where it is determined in steps S112 and S113 of FIG. 7 that "there is no motion" for an object set as a target subject, it is conceivable that a pixel region inside the object is not determined as moire even if there is a motion.

That is, in step S113, erroneous detection of moire can be reduced by detecting a pixel region with a different motion only for a target subject whose motion has been detected.

The second example of the moire detection processing will be described with reference to FIG. 11.

The second example is an example in which moire detection is performed using a result of entire motion detection without performing object recognition in a case where uniform motion information indicating that subjects in an image uniformly move is obtained in advance.

Figure 11:
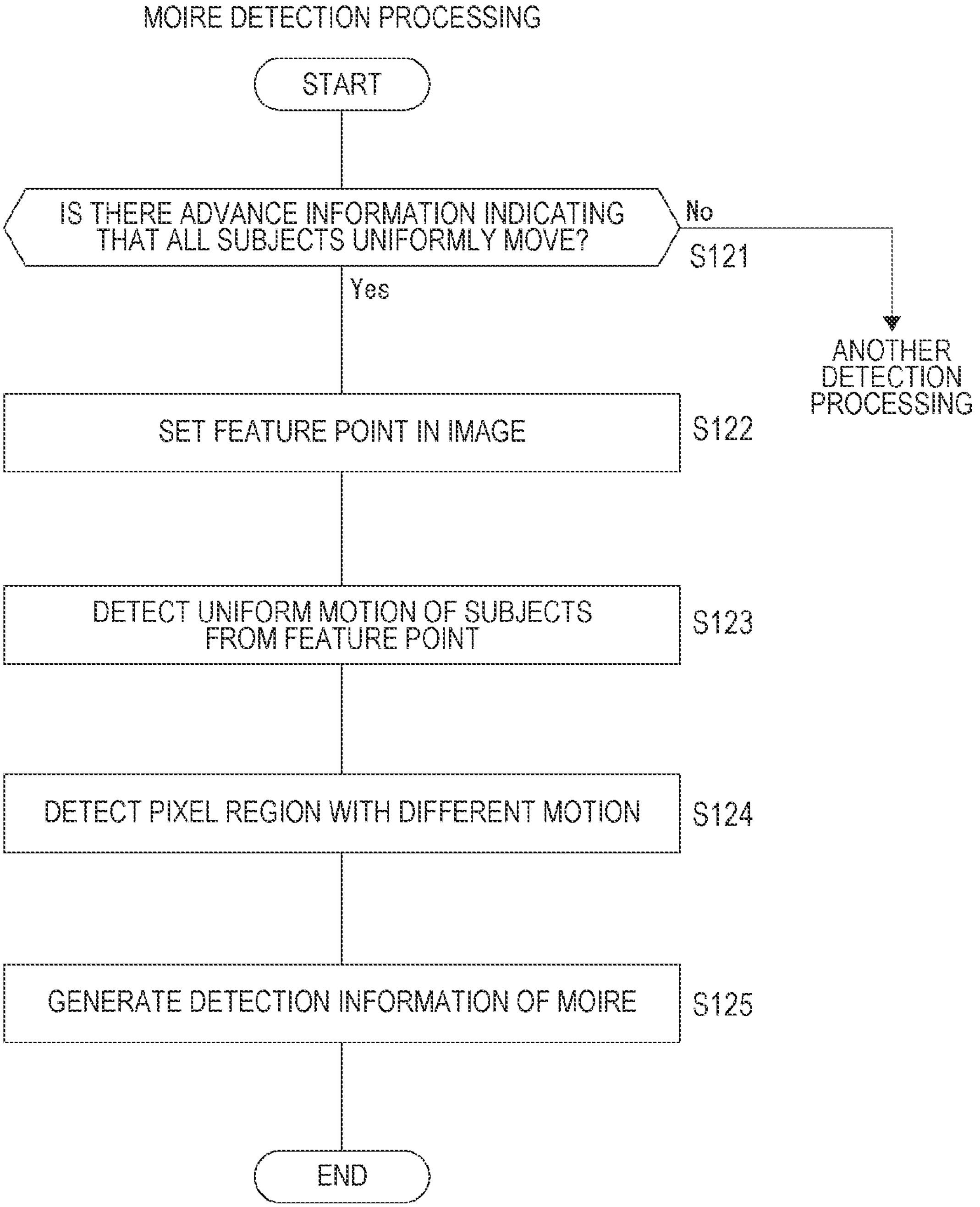
FIG. 11 is a flowchart of a second example of the moire detection processing according to the embodiment.

In step S121 in FIG. 11, the moire detection unit 31 confirms the presence or absence of advance information indicating that all subjects uniformly move, that is, uniform motion information, and causes the processing to branch.

The advance information as the uniform motion information may be, for example, setting of an image capturing mode by a user, or information indicating execution of panning or tilting. Alternatively, if processing is performed on the image data Din captured in the past, the advance information may be an image capturing mode during imaging of the image data Din or information indicating that panning or the like has been performed.

For example, in a case where the user sets an image capturing mode suitable for image capturing of a landscape and a still object, it is assumed that subjects having no motion are set as targets. In this case, the subjects in a screen are expected to uniformly move as a change according to a motion of the imaging apparatus 1.

Similarly, in a case where it is assumed that the user performs panning by setting a panoramic image capturing mode or the like, subjects are expected to uniformly move.

Furthermore, information indicating that a panning operation or a tilting operation is performed by the pan-tilter or the like to which the imaging apparatus 1 is attached is also considered as one of pieces of the advance information indicating a situation in which the subjects having no motion move in an image. However, since the subjects having no motion are not necessarily captured, it is also conceivable to basically apply the moire detection processing of the first example described above when there is the information indicating that the panning operation or the tilting operation is performed. In a case where it is estimated or determined that the subjects have no motion, the information indicating that the panning operation or the tilting operation is performed serves as the advance information indicating that all the subjects uniformly move.

For example, in a case where there is no advance information for assuming that all the subjects uniformly move as described above, the moire detection unit 31 proceeds from step S121 to another processing. For example, the processing in the first example of FIG. 7 may be performed. Alternatively, it is also considered not to execute the moire detection processing.

On the other hand, in a case where there is the advance information as the uniform motion information as described above, the moire detection unit 31 proceeds to step S122 and first sets a feature point in the image. For example, in the current image DinC, one point or a plurality of points, such as a site where a clear edge is detected or a site indicating a characteristic shape, is selected as the feature point.

In step S123, the moire detection unit 31 compares in-frame positions of the feature point in the past image DinP and the current image DinC, and detects a uniform motion (direction and speed) of the subjects in the image.

In step S124, the moire detection unit 31 compares the past image DinP and the current image DinC, and detects a pixel showing a motion different from the uniform motion. In this case, since the respective subjects perform the uniform motion, a pixel region in which the same motion as that of the subjects is assumed is the entire frame. Therefore, a pixel showing a motion different from the uniform motion is determined among pixels of the entire frame, and a region of such a pixel is detected. That is, a portion in which a motion in a different direction or a motion at a different speed as compared with the entire motion appears is locally detected.

Then, in step S125, the moire detection unit 31 generates the detection information Sdt (moire presence/absence information and area information) on the basis of detection of a pixel region showing a motion different from the uniform motion.

In a case where the uniform motion of the subjects is assumed in this manner, moire detection can be performed on the basis of a difference in the motion similarly to the first example without performing object recognition.

The third example of the moire detection processing will be described with reference to FIG. 12.

The third example is an example in which, in a case where subjects do not move and information on a motion of the tripod or the pan-tilter is obtained, or information on a motion of the imaging apparatus 1 itself is obtained as IMU data of the sensor unit 23 or the like, a site that is not consistent with the motion is determined as moire.

Figure 12:
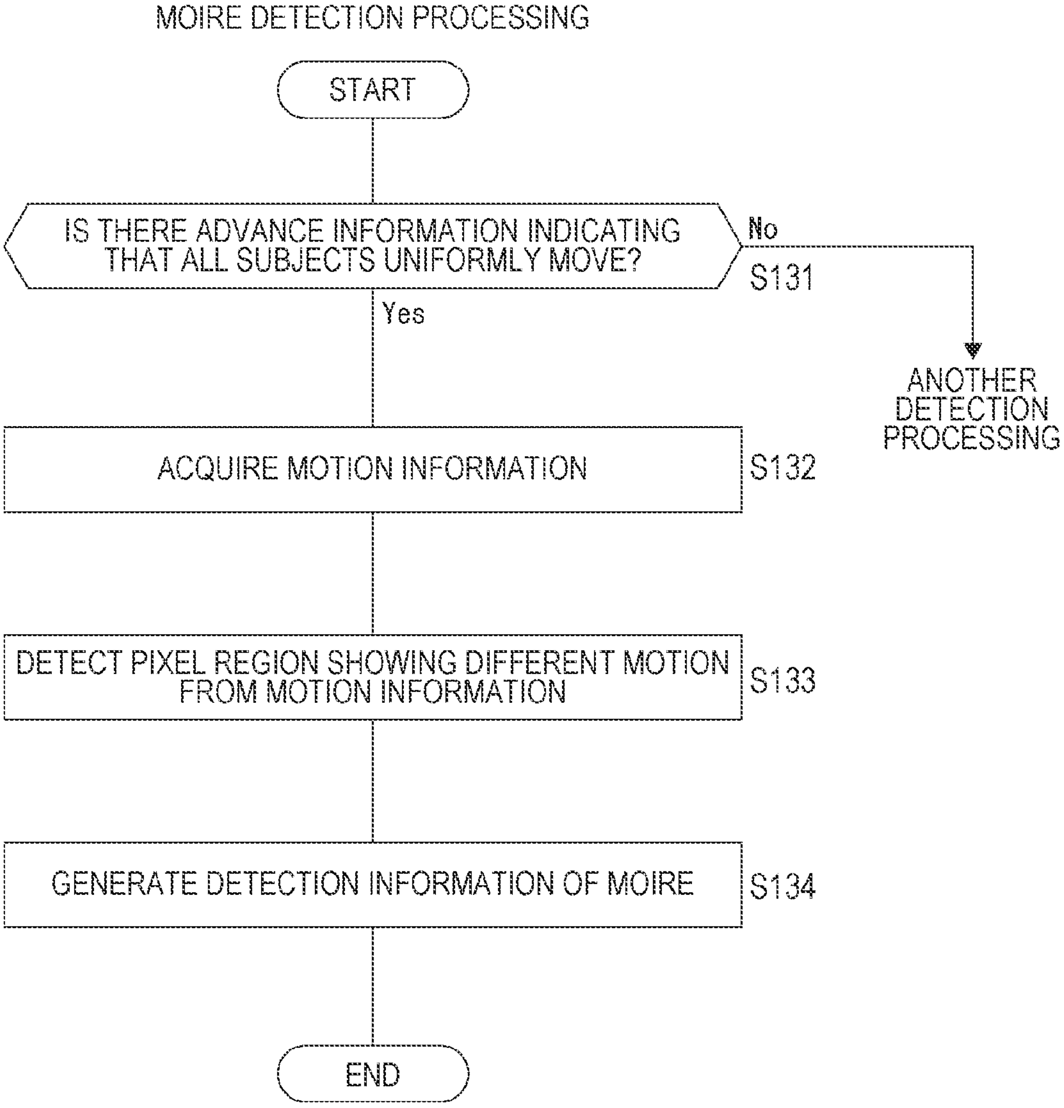
FIG. 12 is a flowchart of a third example of the moire detection processing according to the embodiment.

In step S131 in FIG. 12, the moire detection unit 31 confirms whether or not uniform motion information indicating that all the subjects uniformly move is obtained as advance information, and causes the processing to branch.

This is similar to step S121 in FIG. 11, and the advance information as the uniform motion information can be considered as, for example, information indicating setting of an image capturing mode by the user, the setting of the image capturing mode being suitable for capturing a landscape or a still object by the user, information of a panoramic image capturing mode, information such as panning by the pan-tilter, or the like.

Note that, in the case of the third example, it is premised that the imaging apparatus 1 is mounted on the pan-tilter or the like and can detect a direction and a speed of a panning or tilting motion, or can detect a direction and a speed of a motion of the imaging apparatus 1 itself as IMU data from the sensor unit 23 or the like.

In a case where there is no advance information as the uniform motion information as described above, the moire detection unit 31 proceeds from step S131 to another processing. For example, the processing of the first example of FIG. 7 may be performed, or it is also considered not to execute the moire detection processing.

On the other hand, in a case where there is the advance information as the uniform motion information as described above, the moire detection unit 31 proceeds to step S132 and acquires motion information.

For example, information on an image capturing direction of the pan-tilter corresponding to each time point of a frame of the past image DinP and a frame of the current image DinC, IMU data corresponding to each of the frames, and the like are acquired. From these pieces of information, the uniform motion (direction and speed) of all the subjects can be detected.

In step S133, the moire detection unit 31 compares the past image DinP and the current image DinC, and detects a pixel showing a motion different from the uniform motion. In this case, since the respective subjects perform the uniform motion as a motion that is the same as the motion of the pan-tilter or the imaging apparatus 1, a pixel region in which the same motion as that of the subjects is assumed is the entire frame. Therefore, a pixel showing a motion different from the uniform motion is determined among pixels of the entire frame, and a region of such a pixel is detected. That is, a portion in which a motion in a different direction or a motion at a different speed as compared with the motion of the imaging apparatus 1 such as panning appears is locally detected.

Then, in step S134, the moire detection unit 31 generates the detection information Sdt (moire presence/absence information and area information) on the basis of detection of a pixel region showing a motion different from the uniform motion.

In a case where it is assumed that the subjects do not move in this manner, the motion of the pan-tilter or the imaging apparatus 1 can be set as the uniform motion of the subjects, and the portion with the different motion can be detected as the moire.

Note that, when there is a pixel region with a different motion, the pixel region is detected as moire in the moire detection processing as in the first example, the second example, and the third example, but it is conceivable to adjust the determination that the "motion" is different in accordance with various situations.

For example, it is also assumed that a motion in a recognized subject does not strictly coincide with the entire motion of the subject. For example, there is a case where a motion of a person as a whole and a motion of each part of clothing are slightly different, or a case where a plant is swayed due to wind or the like and becomes slightly different from a uniform motion. It is not appropriate to determine moire including such a slight difference.

In this regard, it is conceivable that thresholds for a direction difference and a speed difference for the determination of the "different motion" are set to values with which no minute difference is detected, or are variable according to situations. For example, it is conceivable to change the thresholds according to a type of a recognized subject or change the thresholds according to a speed of a motion of the imaging apparatus 1 or the like.

5. EXAMPLE OF MOIRE REDUCTION PROCESSING

Next, specific examples (a first example, a second example, and a third example) of moire reduction processing by moire reduction unit 32 will be described. The respective examples are processing examples performed by the moire reduction unit 32 that receives an input of the detection information Sdt as illustrated in FIG. 3.

Figure 13:
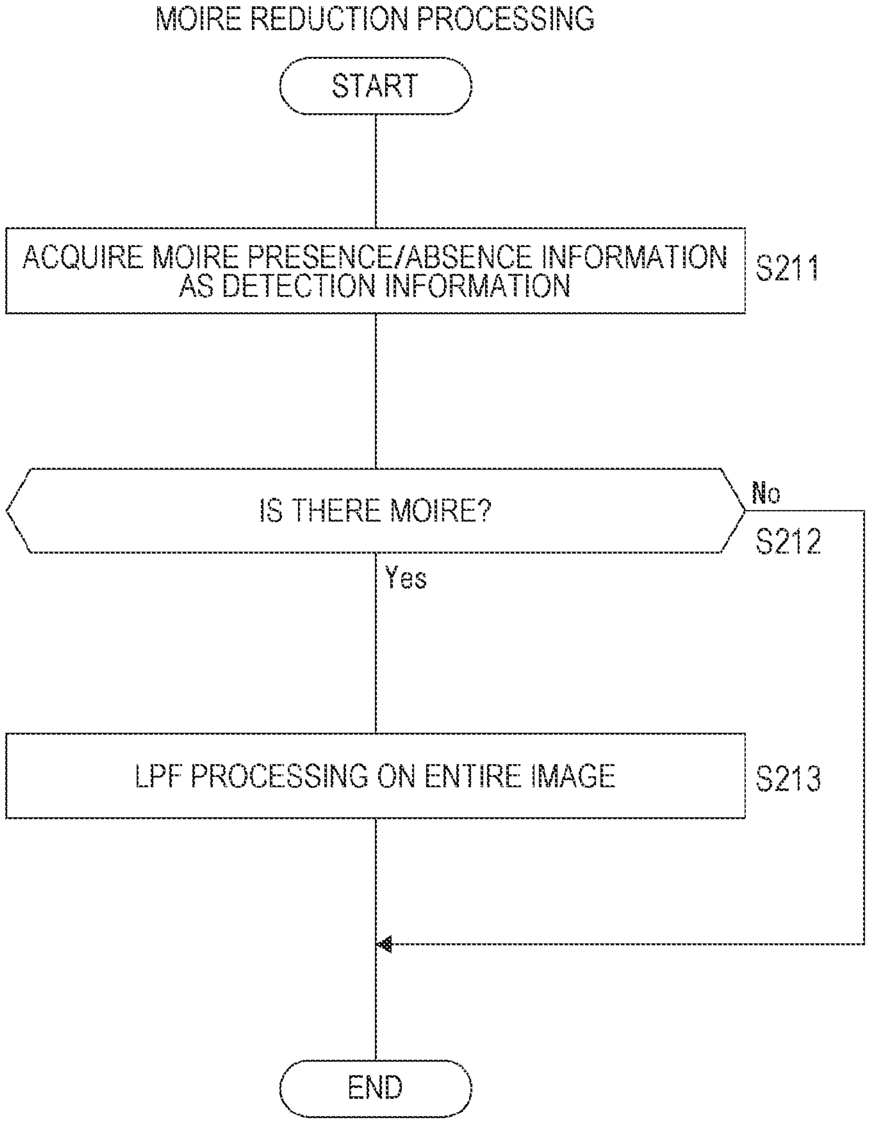
FIG. 13 is a flowchart of a first example of the moire reduction processing according to the embodiment.

FIG. 13 illustrates the first example of the moire reduction processing. This is an example of a case where moire presence/absence information is input as the detection information Sdt.

In step S211, the moire reduction unit 32 acquires the moire presence/absence information as the detection information Sdt.

In step S212, the moire presence/absence information is used to confirm whether or not moire is generated in a frame to be currently processed of the image data Din. When moire is not generated, the moire reduction processing is ended without performing any processing on the frame to be currently processed.

On the other hand, in a case where it is confirmed that moire is generated, the moire reduction unit 32 proceeds to step S213, and performs LPF processing on the entire image data Din to be currently processed.

As a result, it is possible to obtain the image data Dout in which the moire is made inconspicuous.

Figure 14:
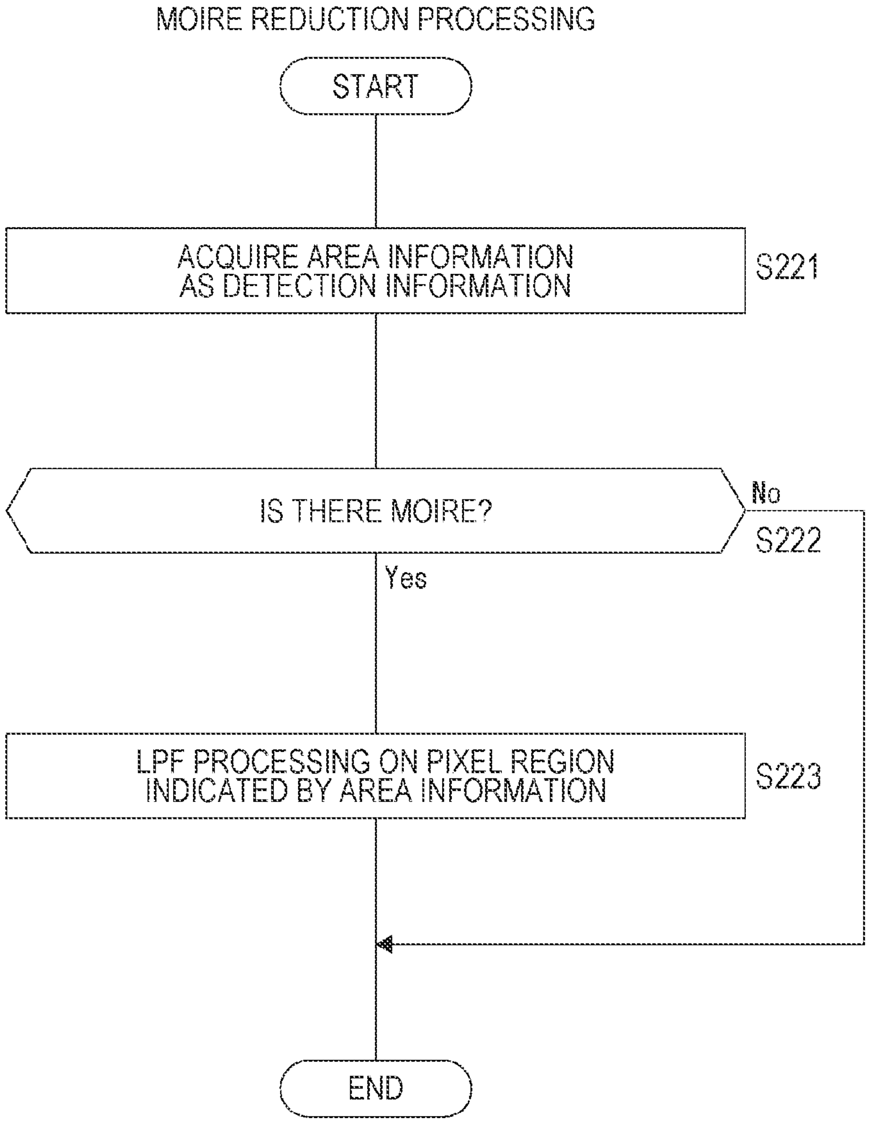
FIG. 14 is a flowchart of a second example of the moire reduction processing according to the embodiment.

FIG. 14 illustrates the second example of the moire reduction processing. This is an example of a case where area information is input as the detection information Sdt.

In step S221, the moire reduction unit 32 acquires the area information indicating a pixel region in which moire has been detected as the detection information Sdt.

In step S222, the moire presence/absence information uses the area information to confirm whether or not moire is generated in a frame to be currently processed of the image data Din. That is, it is confirmed whether or not one or more pixel regions are indicated by the area information.

When moire is not generated, the moire reduction processing is ended without performing any processing on the frame to be currently processed.

On the other hand, in a case where it is confirmed that moire is generated, the moire reduction unit 32 proceeds to step S223, and performs LPF processing on a pixel region indicated by the area information.

As a result, it is possible to obtain the image data Dout with reduced moire in a portion where the moire has been generated.

Figure 15:
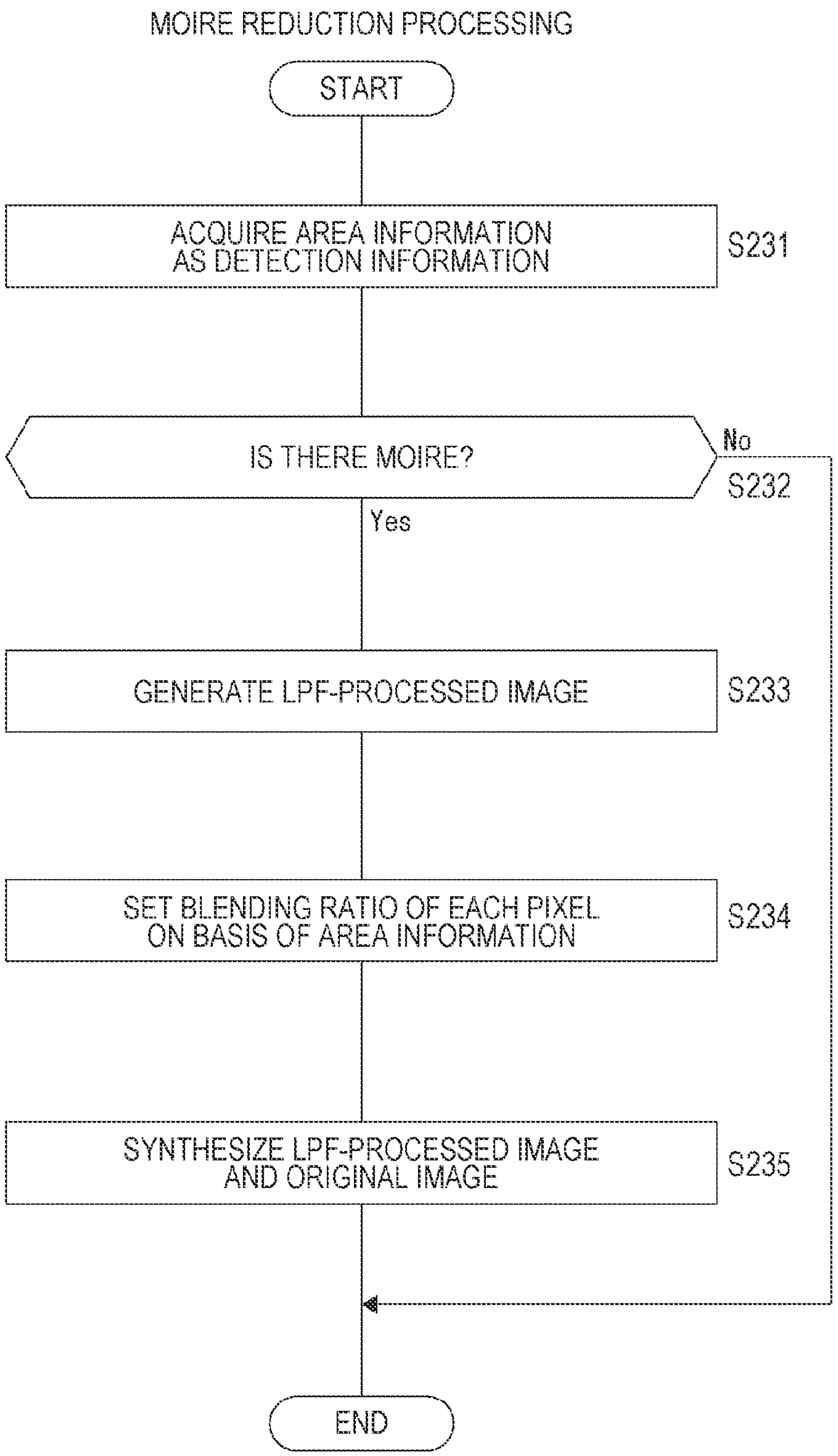
FIG. 15 is a flowchart of a third example of the moire reduction processing according to the embodiment.

FIG. 15 illustrates the third example of the moire reduction processing. This is also an example of the case where the area information is input as the detection information Sdt, but this is an example of performing smoothing processing for smoothing a change in a sense of resolution of an image at a boundary between a portion where LPF processing is performed and a portion where no LPF processing is performed.

In step S231, the moire reduction unit 32 acquires the area information indicating a pixel region in which moire has been detected as the detection information Sdt.

In step S222, the moire presence/absence information uses the area information to confirm whether or not moire is generated in a frame to be currently processed of the image data Din. That is, it is confirmed whether or not one or more pixel regions are indicated by the area information.

When moire is not generated, the moire reduction processing is ended without performing any processing on the frame to be currently processed.

On the other hand, in a case where it is confirmed that moire is generated, the moire reduction unit 32 proceeds to step S223, and generates an LPF-processed image obtained by performing LPF processing on the entire frame.

In step S234, the moire reduction unit 32 sets a blending ratio of each pixel on the basis of the area information. The blending ratio is a mixing ratio of pixel values of the LPF-processed image and an original image (image not subjected to the LPF processing).

The blending ratio of each pixel is set as follows, for example.

Figure 16:
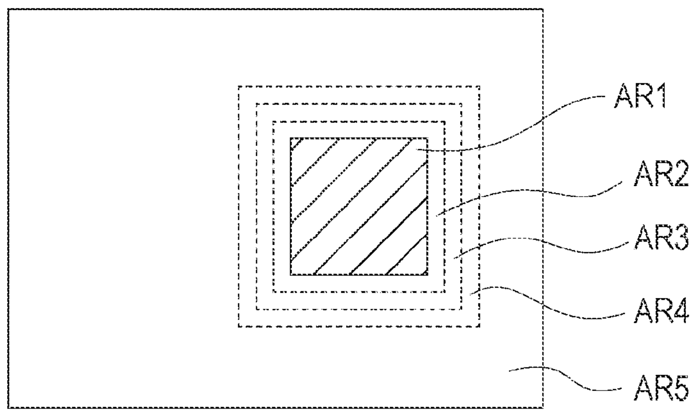
FIG. 16 is an explanatory view of a third example of the moire reduction processing according to the embodiment.

It is assumed that an area AR1 indicated as a hatched portion in FIG. 16 is an area indicated by the area information to have moire.

Areas AR2, AR3, and AR4 are set so as to surround the outer periphery of the area AR1, and the other area is set as an area AR5.

Then, for each of the areas, the blending ratio between the LPF-processed image and the original image is set as follows.

AR1 . . . 100:0
AR2 . . . 75:25
AR3 . . . 50:50
AR4 . . . 25:75
AR5 . . . 0:100

Note that the number of areas divided into the areas AR1 to AR5 and the blending ratios are merely examples given for the sake of description.

In step S235 of FIG. 15, the moire reduction unit 32 synthesizes the LPF-processed image and the original image at the above blending ratios in the areas AR1 to AR5, respectively.

For example, pixels of the LPF-processed image are applied as pixels of the area AR1. Furthermore, pixel values of the respective pixels in the area AR1 are set such that corresponding pixel values between the LPF-processed image and the original image are synthesized at 75:25. The areas AR3 and AR4 are also synthesized at the above-described blending ratios, respectively. Pixels of the original image are applied to the area AR5.

Then, image data obtained as a result of such synthesis is set as the image data Dout obtained by performing the moire reduction.

In this manner, it is possible to make it difficult to feel a difference in the sense of resolution at a boundary between a pixel region subjected to the LPF processing and a pixel region not subjected to the LPF processing.

Note that the LPF processing is performed in the moire reduction processing as in the first example, the second example, and the third example described above, but it is also possible to reduce only moire folded back at a high frequency by adjusting a frequency characteristic, for example, increasing a cutoff frequency. Then, even when there is an error in moire detection such as in a case where a pattern does not disappear even if a low frequency portion is not consistent with a motion of a subject and the pattern is actually moving in the subject, the influence thereof can be reduced.

Furthermore, the cutoff frequency of the LPF processing may be adjusted by the user.

For example, it is conceivable to enable the user to confirm an image after being subjected the moire reduction processing while performing an operation of changing the cutoff frequency and to adjust the sense of resolution of the image and a moire reduction situation to desired states.

Moreover, it is also possible to detect and reduce the moire folded back at the high frequency by the present technique and to use another technique for moire folded back at the low frequency, for example, by detecting a difference between two images having different optical characteristics as the moire and reducing such a portion by the LPF processing.

6. CONCLUSION AND MODIFICATION

According to the above embodiment, the following effects can be obtained.

The image processing unit 20 according to the embodiment includes the moire detection unit 31 that detects a pixel region with a different motion out of a pixel region in which the same motion as a motion of a subject is assumed as a change in an in-frame position between images at different times, and generates the detection information Sdt of moire.

The motion of the subject in the image, that is, the change in the in-frame position of the subject between the images at different times includes a change due to a motion of the subject itself and a change due to a motion of the imaging apparatus 1, for example, a motion such as panning. Then, in a case where there is motion of a specific subject, a pixel region in a contour of the subject is a pixel region in which the same motion as that of the subject is assumed. Furthermore, when there is a motion in the entire subject in the image due to panning or tilting during imaging of a stationary subject, the entire pixel region in a frame is a pixel region in which the same motion as that of the subject is assumed.

Therefore, when the motion of the subject occurs, if a different motion is shown in a pixel region where the same motion as that of the subject should occur, it can be detected that the it is not a pattern or the like of the subject that is to originally exist, but is moire. Since the moire is detected from a state of the motion, that is, a state of the change in the in-frame position between the images at different times in this manner, the moire can be distinguished from the actual pattern and detected regardless of the frequency of the moire.

The image processing unit 20 of the embodiment further includes the moire reduction unit 32 that performs moire reduction processing on the basis of the detection information Sdt.

The moire reduction is performed by, for example, LPF processing or the like on the basis of the detection information of the moire detected from a motion state. Therefore, the moire can be distinguished from an actual pattern and reduced regardless of a frequency of the moire.

In the embodiment, an example has been described in which the moire detection unit 31 detects a motion of a target subject set as a detection processing target on the basis of an object recognition result in an image, and detects a pixel region with a motion different from the motion of the target subject out of a pixel region of the target subject and generates the detection information Sdt (the first example of the moire detection processing, see FIG. 7).

Since one or a plurality of the target subjects is set by recognizing subjects in the image by object recognition, for example, an object such as a person, a thing, or an animal is set as the target subject, and a motion thereof is detected. In all the pixel regions of the target subjects, for example, a motion (change in an in-frame position) similar to a motion of a contour portion as the target subject is to occur. Therefore, in a case where the different motion is detected, it can be determined as moire.

In the embodiment, an example has been described in which the moire detection unit 31 detects a motion of a feature point in an image for the image to which uniform motion information indicating that the entire subject in the image moves uniformly is given, detects a pixel region having a motion different from the motion of the feature point, and generates the detection information Sdt (the second example of the moire detection processing, see FIG. 11).

For example, if an image capturing mode selected by the user, information indicating that a panning operation or a tilting operation is performed by the pan-tilter or the like to which the imaging apparatus 1 is attached, or the like is given as advance information, the moire detection unit 31 can grasp that a uniform motion appears for the entire subject in the image. In this case, a direction and a speed of an original motion caused by the panning or the like can be detected as a change in a position between frames of a certain feature point in the image. In a case where a pixel region showing a motion different from the original motion is detected, it can be determined as moire.

Note that it is also conceivable to selectively use, according to a situation, the processing of detecting the pixel region having the motion different from the motion of the target subject based on the object recognition as illustrated in FIG. 7 and the processing of detecting the pixel region having the motion different from the motion of the feature point according to the advance information as illustrated in FIG. 11.

In the embodiment, an example has been described in which the moire detection unit 31 detects a pixel region having a motion different from motion information indicating a motion of the imaging apparatus during imaging for an image to which uniform motion information indicating that the entire subject in the image moves uniformly is given, and generates the detection information Sdt (the third example of the moire detection processing, see FIG. 12).

For example, the motion of the imaging apparatus 1 during imaging is indicated by input of information on a direction and a speed of the motion from the pan-tilter or the like, IMU data from the sensor unit 23, or the like. In a case where the moire detection unit 31 can grasp that a uniform motion appears for the entire subject in the image on the basis of the advance information, the motion suitable for the motion information indicating the motion of the imaging apparatus 1 should be detected for the entire subject. In this case, in a case where the pixel region showing a motion different from the motion information is detected, it can be determined as moire.

Note that it is also conceivable to selectively use, according to a situation, the processing of detecting the pixel region having the motion different from the motion of the target subject based on the object recognition as illustrated in FIG. 7, the processing of detecting the pixel region having the motion different from the motion of the feature point according to the advance information as illustrated in FIG. 11, and the processing of acquiring the motion information of the entire subject and detecting the pixel region with the different motion as illustrated in FIG. 12.

In the embodiment, it has been described that the detection information Sdt may include moire presence/absence information.

Since at least the moire presence/absence information is included as the detection information Sdt, the moire reduction unit 32 can perform the moire reduction processing only on a frame in which moire has been detected. Since the moire reduction processing is not performed even on an image in which moire is not generated, it is possible to prevent a sense of resolution of the image from being unnecessarily impaired.

In the embodiment, it has been described that the detection information Sdt may include area information indicating a pixel region in which moire has been detected.

Since the area information is included as the detection information Sdt, the moire reduction unit 32 can perform the moire reduction processing only on the pixel region in which the moire has been detected. Therefore, the moire reduction processing can be prevented from being performed on an image region where moire is not generated, and only the moire can be reduced without impairing the sense of resolution of the image.

Figure 2:
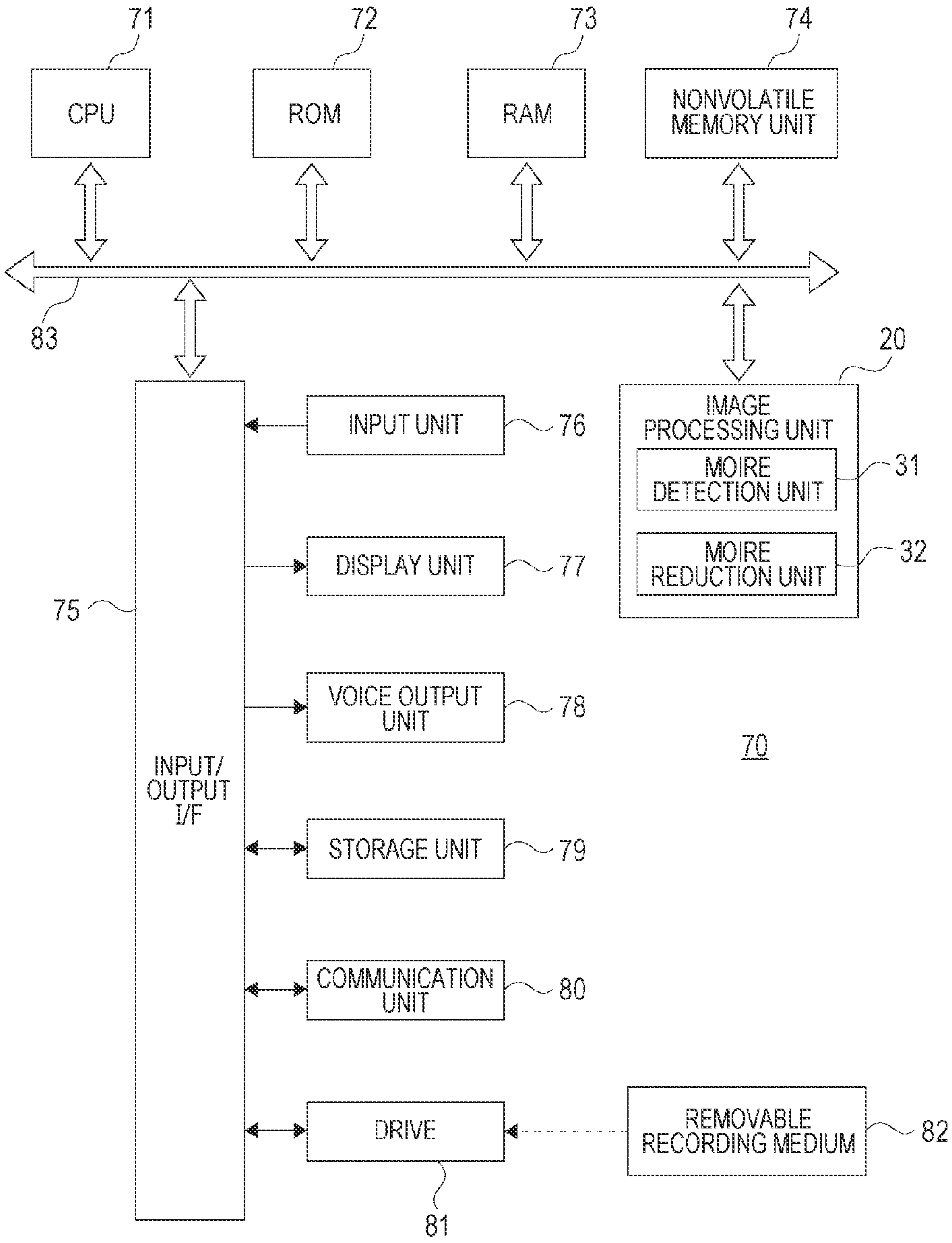
FIG. 2 is a block diagram of an information processing apparatus according to the embodiment.

In the embodiment, an example has been described in which a control unit that associates the detection information Sdt with an image as metadata corresponding to the image, such as the camera control unit 18 of the imaging apparatus 1 and the CPU 71 of the information processing apparatus 70, is provided (see FIGS. 1, 2, and 4).

The camera control unit 18 of the imaging apparatus 1 records the detection information Sdt detected for each frame by the moire detection unit 31 as the metadata associated with the frame of the image on a recording medium or transmits the metadata to an external apparatus, so that a device other than the imaging apparatus 1 can perform the moire reduction processing using the detection information Sdt. Therefore, a moire detection result based on the motion comparison can effectively be used. Even if such processing is performed by the CPU 71 of the information processing apparatus 70, the moire reduction processing using the detection information Sdt can be performed in subsequent processing in the information processing apparatus 70 or processing in another device.

An example has been described in which the moire reduction unit 32 of the embodiment performs the moire reduction processing by LPF processing on an image (see the first example (FIG. 13), the second example (FIG. 14), and the third example (FIG. 15) of the moire reduction processing).

The moire reduction unit 32 is formed using an LPF, and performs the LPF processing on a current image (the image data Din) on the basis of the detection information Sdt as illustrated in FIG. 3, so that the moire reduction is executed when necessary.

In the embodiment, an example has been described in which the moire reduction unit 32 performs the moire reduction processing by the LPF processing on a pixel region indicated by the area information on the basis of the detection information Sdt including the area information indicating the pixel region in which moire has been detected (the second example of the moire reduction processing, see FIG. 14). For example, the LPF processing is performed only on the pixel region indicated by the area information.

In a case where the area information is supplied as the detection information Sdt, the moire reduction unit 32 can perform the LPF processing only on the pixel region where the moire is generated. Therefore, it is possible to achieve the moire reduction in which the LPF processing is not performed on a portion other than the moire and the sense of resolution is not impaired at a portion where moire is not generated.

In the embodiment, an example has been described in which the moire reduction unit 32 performs the moire reduction processing by the LPF processing on a pixel region indicated by the area information on the basis of the detection information Sdt including the area information indicating the pixel region in which moire has been detected and performs smoothing processing of gradually changing a degree of reflection of the LPF processing in a region around the pixel region indicated by the area information (the third example of the moire reduction processing, see FIGS. 15 and 16).

In a case where the area information is supplied as the detection information Sdt, when the LPF processing is performed on the pixel region indicated by the area information and the LPF processing is not performed on the other regions, smoothness of an image may be lost at a boundary of the pixel region. In this regard, the smoothing processing as described with reference to FIGS. 15 and 16 is performed. Therefore, it is possible to prevent the pixel region where the moire has been detected from appearing unnatural.

In the embodiment, an example has been described in which the moire reduction unit 32 performs the moire reduction processing by the LPF processing on the entire image on the basis of the detection information Sdt including the moire presence/absence information (the first example of the moire reduction processing, see FIG. 13).

In a case where the moire presence/absence information is supplied as the detection information Sdt, the moire reduction unit 32 can perform the moire reduction by performing the LPF processing on the entire image in which the moire is generated. In other words, the LPF processing can be prevented from being performed on an image in which moire is not generated.

Note that the moire reduction unit 32 may switch the LPF processing according to a content of the detection information Sdt. For example, it is conceivable to perform the LPF processing on the entire image in a case where only the moire presence/absence information is included in the detection information Sdt, and to perform the LPF processing on the pixel region indicated by the area information in a case where the area information is included in the detection information Sdt.

In the embodiment, an example has been described in which the moire reduction unit 32 performs the moire reduction processing by the LPF processing on an image, and variably sets a cutoff frequency of the LPF processing.

For example, the moire reduction processing according to the user's idea or a situation can be performed by changing the cutoff frequency of the LPF processing according to a user operation or the situation.

For example, it is conceivable to lower the cutoff frequency when a subject is stationary or the imaging apparatus 1 is moving.

A program according to the embodiment is a program for causing an arithmetic processing device such as a CPU, a DSP, a GPU, a GPGPU, or an AI processor, or a device including these to execute the moire detection processing as illustrated in FIGS. 4, 7, 11, and 12.

That is, the program according to the embodiment is a program for causing the arithmetic processing device to execute processing of detecting a pixel region with a different motion out of a pixel region in which a motion same as a motion of a subject is assumed as a change in an in-frame position between images at different times, and generating the detection information Sdt of moire.

With such a program, the image processing apparatus referred to in the present disclosure can be implemented by various types of computer apparatuses.

Moreover, the program may be a program for causing, for example, a CPU, a DSP, a GPU, a GPGPU, or an AI processor or a device including these to execute the moire reduction processing illustrated in FIGS. 5, 13, 14, and 15.

These programs can be recorded in advance in an HDD as a recording medium built in equipment such as a computer apparatus, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, or a memory card. Such a removable recording medium can be provided as so-called package software.

Furthermore, such a program can be installed from the removable recording medium into a personal computer or the like, or can be downloaded from a download site via a network such as a local area network (LAN) or the Internet.

Furthermore, such a program is suitable for providing the image processing apparatus of the present disclosure in a wide range. For example, by downloading the program to a mobile terminal device such as a smartphone, a tablet, or the like, a mobile phone, a personal computer, game equipment, video equipment, a personal digital assistant (PDA), or the like, such equipment can be caused to function as the image processing apparatus of the present disclosure.

Note that the effects described herein are merely examples and not limiting, and there may be other effects.

Note that the present technology can also employ the following configurations.

(1)

An image processing apparatus including a moire detection unit that detects a pixel region with a different motion out of a pixel region in which the same motion as a motion of a subject is assumed as a change in an in-frame position between images at different times, and generates detection information of moire.

(2)

The image processing apparatus according to (1), further including a moire reduction unit that performs moire reduction processing on the basis of the detection information.

(3)

The image processing apparatus according to (1) or (2), in which the moire detection unit detects a motion of a target subject set as a detection processing target on the basis of an object recognition result in an image, and detects a pixel region with a motion different from the motion of the target subject out of a pixel region of the target subject and generates the detection information.

(4)

The image processing apparatus according to any one of (1) to (3), in which the moire detection unit detects a pixel region with a motion different from a motion of a feature point in an image to which uniform motion information indicating that the entire subject in the image performs a uniform motion is given, and generates the detection information.

(5)

The image processing apparatus according to any one of (1) to (4), in which the moire detection unit detects a pixel region in which a motion, different from motion information indicating a motion of an imaging apparatus during imaging, appears in an image to which uniform motion information indicating that the entire subject in the image performs a uniform motion is given, and generates the detection information.

(6)

The image processing apparatus according to any one of (1) to (5), in which the detection information includes moire presence/absence information.

(7)

The image processing apparatus according to any one of (1) to (6), in which the detection information includes area information indicating the pixel region in which the moire has been detected.

(8)

The image processing apparatus according to any one of (1) to (7), further including a control unit that associates the detection information with an image as metadata corresponding to the image.

(9)

The image processing apparatus according to (2), in which the moire reduction unit performs the moire reduction processing by low-pass filter processing on an image.

(10)

The image processing apparatus according to (2) or (9), in which the moire reduction unit on the basis of the detection information including area information indicating the pixel region in which the moire has been detected, performs the moire reduction processing by low-pass filter processing on the pixel region indicated by the area information.

(11)

The image processing apparatus according to any one of (2), (9), and (10), in which the moire reduction unit on the basis of the detection information including area information indicating the pixel region in which the moire has been detected, performs the moire reduction processing by low-pass filter processing on the pixel region indicated by the area information, and performs smoothing processing of gradually changing a degree of reflection of the low-pass filter processing on a region around the pixel region indicated by the area information.

(12)

The image processing apparatus according to any one of (2), (9), (10), and (11), in which the moire reduction unit performs the moire reduction processing by low-pass filter processing on the entire image on the basis of the detection information including moire presence/absence information.

(13)

The image processing apparatus according to any one of (2), (9), (10), (11), and (12), in which the moire reduction unit performs the moire reduction processing by low-pass filter processing on an image, and variably sets a cutoff frequency of the low-pass filter processing.

(14)

An image processing method including detecting a pixel region with a different motion out of a pixel region in which the same motion as a motion of a subject is assumed as a change in an in-frame position between images at different times, and generating detection information of moire.

(15)

A program for causing an arithmetic processing device to execute processing of detecting a pixel region with a different motion out of a pixel region in which the same motion as a motion of a subject is assumed as a change in an in-frame position between images at different times, and generating detection information of moire.

REFERENCE SIGNS LIST

1 Imaging apparatus
11 Lens system
12 Imaging element unit
12*a* Imaging element
18 Camera control unit
20 Image processing unit
21 Buffer memory
30 Memory
31 Moire detection unit
32 Moire reduction unit
70 Information processing apparatus
71 CPU

The invention claimed is:

1. An image processing apparatus, comprising:
a central processing unit (CPU) configured to:
acquire raw image data, wherein the raw image data comprises current image data and past image data;
perform an object recognition process on the current image data and the past image data;
set, based on the performed object recognition process, a target subject from a plurality of subjects in the current image data;
detect a motion of the set target subject of the plurality of subjects, wherein
an in-frame position of the target subject in the current image data is different from an in-frame position of the target subject in the past image data, and
the current image data and the past image data are captured at different time intervals;
detect a specific motion of a first pixel region of a plurality of pixel regions of the target subject, wherein
the detected specific motion of the first pixel region is different from the detected specific motion of the target subject;
determine the first pixel region, within the target subject, with the detected specific motion as a moire portion, wherein the moire portion has moire;
generate detection information of the moire, wherein
the generated detection information includes moire presence or absence information and area information indicating the first pixel region of the target subject having the moire; and
perform, based on the generated detection information, a moire reduction process by a low-pass filter (LPF) process on the current image data.

2. The image processing apparatus according to claim 1, wherein
the CPU is further configured to:
set a feature point in the current image data;
compare an in-frame position of the feature point in the current image data and an in-frame position of the feature point in the past image data;
detect, based on the comparison of the in-frame position of the feature point in the current image data and the in-frame position of the feature point in the past image data, a uniform motion of the plurality of subjects;
detect a second pixel region with a motion different from a motion of the feature point in the current image data, wherein
the motion of the feature point is the uniform motion; and
generate, based on the detection of the second pixel region, the detection information.

3. The image processing apparatus according to claim 1, wherein
the CPU is further configured to:
detect a third pixel region in which a motion is different from a motion, of an imaging apparatus, at a time of imaging; and
generate, based on the detected third pixel region, the detection information.

4. The image processing apparatus according to claim 1 wherein the CPU is further configured to:
set the detection information as metadata corresponding to the raw image data.

5. The image processing apparatus according to claim 1 wherein
the CPU is further configured to:
perform the moire reduction process by the low-pass filter process on the first pixel region indicated by the area information.

6. The image processing apparatus according to claim 1, wherein
the CPU is further configured to:
perform the moire reduction process based on the low-pass filter process on the first pixel region, wherein
the first pixel region is indicated by the area information, and
perform a smoothing process on a region around the first pixel region.

7. The image processing apparatus according to claim 1, wherein
the CPU is further configured to:
perform the moire reduction process by the low-pass filter process on the current image data, and
set a cutoff frequency of the low-pass filter process.

8. An image processing method, comprising:
acquiring raw image data, wherein the raw image data comprises current image data and past image data;
performing an object recognition process on the current image data and the past image data;
setting, based on the performed object recognition process, a target subject from a plurality of subjects in the current image data;
detecting a motion of the set target subject of the plurality of subjects, wherein
an in-frame position of the target subject in the current image data is different from an in-frame position of the target subject in the past image data, and
the current image data and the past image data are captured at different time intervals;
detecting a specific motion of a pixel region of a plurality of pixel regions of the target subject, wherein
the detected specific motion of the pixel region is different from the detected specific motion of the target subject;
determining the pixel region, within the target subject, with the detected specific motion as a moire portion, wherein the moire portion has moire;

generating, based on the detection of the pixel region, detection information of the moire, wherein the generated detection information includes moire presence or absence information and area information indicating the pixel region of the target subject having the moire; and performing, based on the generated detection information, a moire reduction process by a low-pass filter (LPF) process on the current image data.

9. An image processing apparatus, comprising:

a central processing unit (CPU) configured to:

perform an object recognition process on current image data and past image data, wherein the object recognition process is based on a semantic segmentation process and a pattern recognition process;

set, based on the performed object recognition process, a target subject from a plurality of subjects in the current image data;

compare an in-frame position of the target subject in the current image data and an in-frame position of the target subject in the past image data, wherein the in-frame position of the target subject in the current image data is different from the in-frame position of the target subject in the past image data, and the current image data and the past image data are captured at different time intervals;

detect, based on the comparison, a specific motion of a pixel region of a plurality of pixel regions of the target subject, wherein the detected specific motion of the pixel region is different from a motion of the target subject;

determine the pixel region, within the target subject, with the detected specific motion as a moire portion, wherein the moire portion has moire;

generate detection information of the moire; and perform, based on the generated detection information, a moire reduction process by a low-pass filter (LPF) process on the current image data.

10. The image processing apparatus according to claim 1, wherein the CPU is further configured to:

set a blending ratio of each pixel region of the plurality of pixel regions, based on the area information, wherein the blending ratio is a mixing ratio of pixel values of the LPF processed current image data and the current image data; and perform a smoothing process to gradually change a degree of reflection of the LPF process in a region around the first pixel region indicated by the area information.

11. The image processing apparatus according to claim 10, wherein the set blending ratio of each pixel region of the plurality of pixel regions is based on a distance between the corresponding pixel region and the first pixel region.

12. The image processing apparatus according to claim 1, wherein the set target subject has a frequency component exceeding a Nyquist frequency, and the CPU is further configured to perform the LPF process to reduce the moire by a blurring operation in the moire portion.

* * * * *